US012811184B2

(12) United States Patent
Azimi et al.

(10) Patent No.: US 12,811,184 B2
(45) Date of Patent: Nov. 24, 2026

(54) ALUMINUM-ION BATTERY USING ALUMINUM CHLORIDE/TRIMETHYLAMINE IONIC LIQUID AS ELECTROLYTE

(71) Applicant: THE GOVERNING COUNCIL OF THE UNIVERSITY OF TORONTO, Toronto (CA)

(72) Inventors: Gisele Azimi, North York (CA); Kok Long Ng, Toronto (CA)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 1050 days.

(21) Appl. No.: 17/801,763

(22) PCT Filed: Feb. 24, 2021

(86) PCT No.: PCT/CA2021/050210
§ 371 (c)(1),
(2) Date: Aug. 23, 2022

(87) PCT Pub. No.: WO2021/168553
PCT Pub. Date: Sep. 2, 2021

(65) Prior Publication Data

US 2023/0104025 A1 Apr. 6, 2023

Related U.S. Application Data

(60) Provisional application No. 62/980,646, filed on Feb. 24, 2020.

(51) Int. Cl.
*H01M 10/054* (2010.01)
*H01M 4/46* (2006.01)
(Continued)

(52) U.S. Cl.
CPC ........... *H01M 10/054* (2013.01); *H01M 4/46* (2013.01); *H01M 4/463* (2013.01); *H01M 4/583* (2013.01);
(Continued)

(58) Field of Classification Search
CPC ...... H01M 10/054; H01M 4/46; H01M 4/463; H01M 4/583; H01M 2300/0045;
(Continued)

(56) References Cited

U.S. PATENT DOCUMENTS 9,242,862 B2 * 1/2016 Tsubokura ............ C07C 303/40
10,340,552 B1 7/2019 Hsu et al.

OTHER PUBLICATIONS

PCT/CA2021/050210 Written Opinion of the International Searching Authority; Dated: May 11, 2021, 7 pages.
(Continued)

*Primary Examiner* — Laura Weiner
(74) *Attorney, Agent, or Firm* — Nolte Lackenbach Siegel

(57) ABSTRACT

Here is described an aluminum-ion battery technology having an electrolyte comprising an aluminum trichloride (Al—Cl3)/trimethylamine hydrochloride ionic liquid, aluminum metal as the anode material, and a compatible cathode active material. A wide variety of applications ranging from energy storage in consumer electronics to electric vehicles and to grid storage is also considered.

12 Claims, 10 Drawing Sheets

(51) Int. Cl.
*H01M 4/583* (2010.01)
*H01M 10/0568* (2010.01)
*H01M 10/0569* (2010.01)

(52) U.S. Cl.
CPC ... *H01M 10/0568* (2013.01); *H01M 10/0569* (2013.01); *H01M 2300/0025* (2013.01); *H01M 2300/0045* (2013.01)

(58) Field of Classification Search
CPC ..... H01M 10/0568; H01M 2300/0025; H01M 10/0569; H01M 2300/0031
See application file for complete search history.

(56) References Cited

OTHER PUBLICATIONS

S. Xia et al. "Ionic liquid electrolytes for aluminium secondary battery: Influence of organic solvents", Journal of Electroanalytical Chemistry, vol. 757, Nov. 15, 2015, pp. 167-175.
Feng Wu et al. "Paving the Path toward Reliable Cathode Materials for Aluminum-Ion Batteries", Advanced materials, vol. 31, Issue 16, Apr. 19, 2019, 18 pages.
Kok Long Ng et al. "High-Performance Aluminum Ion Battery Using Cost-Effective AlCl3-Trimethylamine Hydrochloride Ionic Liquid Electrolyte", Advanced Sustainable Systems, 2020, 12 pages.
Xia, et al., "Ionic liquid electrolytes for aluminium secondary battery: Influence of organic solvents" Journal of Electroanalytical Chemistry 757, (2015), pp. 167-175.
Xu, et al., "Capacitive charge storage enables an ultrahigh cathode capacity in aluminum-graphene battery", Journal of Energy Chemistry 45, (2019), pp. 40-44.
Yin, et al., "Effect of solution concentration on the Raman scattering cross-section of carbon tetrachloride", Journal of Raman Spectroscopy, 35, (2004), pp. 1042-1046.
Zheng, et al., "Density, Viscosity, and Conductivity of Lewis Acidic 1-Butyl- and 1-Hydrogen-3-methylimidazolium Chloroaluminate Ionic Liquids" Journal of Chemical & Engineering Data 58, (2013), pp. 32-42.
Zhu, et al., "Rechargeable aluminum batteries: effects of cations in ionic liquid electrolytes", RSC Advances 9, (2019), pp. 11322-11330.
Zhang, et al., "Large-Sized Few-Layer Graphene Enables an Ultrafast and Long-Life Aluminum-Ion Battery", Advanced Energy Materials 7, 1700034 DOI: 10.1002/aenm.201700034, (2017), pp. 1-7.
Zu, et al., "Thermodynamic analysis on energy densities of batteries", Energy & Environmental Science 4, (2011), pp. 2614-2624.
Ng, et al., "High-Performance Aluminum Ion Battery Using Cost-Effective AICI3-Trimethylamine Hydrochloride Ionic Liquid Electrolyte", Advanced Sustainable Systems 4, 2000074, (2020), pp. 1-12.
Wu, et al., "Paving the Path toward Reliable Cathode Materials for Aluminum-Ion Batteries", Advanced Materials 31, DOI: 10.1002/adma.201806510, (2019), pp. 1-18.
Xu et al., "Low-cost AlCl3/Et3NHCl electrolyte for high-performance aluminum-ion battery", Energy Storage Materials 17, (2019), pp. 38-45.
Abood et al., Chem. Commun. "Do all ionic liquids need organic cations? Characterisation of [AlCl2nAmide]+ AlCl4- and comparison with imidazolium based system" 2011, 47, pp. 3523-3525.
Anawati et al., Waste Management, "Recovery of scandium from Canadian bauxite residue utilizing acid baking followed by water leaching" 2019, 95, pp. 549-559.
Angell et al., Proceedings of the National Academy of Sciences, "High Coulombic efficiency aluminum-ion battery using an AlCl3-urea ionic liquid analog electrolyte" Jan. 31, 2017, vol. 114 No. 5, pp. 834-839.
Chen, et al., Advanced Materials, "A Defect-Free Principle for Advanced Graphene Cathode of Aluminum-Ion Battery" Advanced Mater. 2017, 29, 1605958, pp. 1-7.
Chen, et al., Advanced Energy Materials, "High-Quality Graphene Microflower Design for High-Performance Li—S and Al-Ion Batteries" 2017, 7, 1700051, pp. 1-9.
Dong et al., Carbon "Commercial expanded graphite as high-performance cathode for lowcost aluminum-ion battery" Carbon 148, 2019 pp. 134-140.
Elia et al., Applied Materials & Interfaces, "Polyacrylonitrile Separator for High-Performance Aluminum Batteries with Improved Interface Stability" Interfaces 2017, 9, pp. 38381-38389.
Tuang et al., Energies "Influence of High Loading on the Performance of Natural Graphite-Based Al Secondary Batteries" Energies 2018, 11, pp. 1-12.
Lin et al., Nature "An ultrafast rechargeable aluminium-ion battery" Apr. 16, 2015, vol. 520, 325.
Liu et al., American Chemical Society Nano, "Waterproof and Tailorable Elastic Rechargeable Yarn Zinc Ion Batteries by a Cross-Linked Polyacrylamide Electrolyte" 2018, 12, pp. 3140-3148.
Ng et al., Electrochim. Acta, "A low-cost rechargeable aluminum/natural graphite battery utilizing urea-based ionic liquid analog" 2019, 327, 135031, pp. 1-11.
Stadie et al., American Chemical Society Nano "Zeolite-Templated Carbon as an Ordered Microporous Electrode for Aluminum Batteries" 2017, 11, pp. 1911-1919.
Uemura et al., ACS Applied Energy Materials, "Graphene Nanoplatelet Composite Cathode for a Chloroaluminate Ionic Liquid-Based Aluminum Secondary Battery" 2018, 1, pp. 2269-2274.
Walter, et al., Advanced Materials, "Polypyrenes as High-Performance Cathode Materials for Aluminum Batteries" 2018, 30, 1705644, pp. 1-6.
Wang et al., Nature Communications, "Advanced rechargeable aluminium ion battery with a high-quality natural graphite cathode", Article Feb. 13, 2017, 8, 14283 pp. 1-7.
Wu et al., Advanced Materials, "3D Graphitic Foams Derived from Chloroaluminate Anion Intercalation for Ultrafast Aluminum-Ion Battery" 2016, 28, pp. 9218-9222.
Xu et al., Energy Storage Materials, "All-in-one lithium-sulfur battery enabled by a porous-dense-porous gamet architecture" 2018, pp. 458-464.
Yu, et al., Adv. Mater. "Graphene Nanoribbons on Highly Porous 3D Graphene for High-Capacity and Ultrastable Al-Ion Batteries" 2017, 29, 1604118, pp. 1-8.
Zhang, et al., Advanced Materials, "Emerging Nonaqueous Aluminum-Ion Batteries: Challenges, Status, and Perspectives" 2018, 30, 1706310, pp. 1-23.
Zhang et al., Energy Storage Materials, "Low-temperature synthesis of edge-rich graphene paper for highperformance aluminum batteries" Energy Storage Materials 15 (2018), pp. 361-367.
Boon, et al., J. Org. Chem. "Friedel-Crafts Reactions in Ambient-Temperature Molten Salts" 1986, vol. 51, No. 4, pp. 480-483.
Brown, et al., Top Curr Chem, "Lewis Acidic Ionic Liquids", Top Curr Chem (Z) (2017) 375:78, pp. 1-40.
Chen, et al., Science Advances, "Ultrafast all-climate aluminum-graphene battery with quarter-million cycle life" Dec. 15, 2017, 3, eaao7233, pp. 1-8.
Dresselhaus, et al., Advances in Physics, "Intercalation compounds of graphite" 1981, vol. 30, No. 2, pp. 139-326.
Dunn, et al., Argonne National Laboratory, Material and Energy Flows in the Materials Production, Assembly, and End-of-Life Stages of the Automotive Lithium-Ion Battery Life Cyclel, Jun. 2012, pp. 1-73.
Jow, et al., J. The Electrochem. Society, "Electrochemical Capacitors Using Hydrous Ruthenium Oxide and Hydrogen Inserted Ruthenium Oxide" 1998, 145, 49.
Elia, et al., Journal of Power Sources, "An overview and prospective on Al and Al-ion battery technologies" (2021), pp. 1-22.
Fannin, et al., The Journal of Physical Chemistry, "Properties of 1,3-Dialkyiimidazolium Chloride-Aluminum Chloride Ionic Liquids. 1. Ion Interactions by Nuclear Magnetic Resonance Spectroscopy" 1984, vol. 88, No. 12, pp. 2609-2614.

(56) References Cited

OTHER PUBLICATIONS

Fannin, et al., he Journal of Physical Chemistry, "Properties of 1,3-Dialkylimldazollum Chloride-Aluminum Chloride Ionic Liquids. 2. Phase Transitions, Densities, Electrical Conductivities, and Viscosities" 1984, vol. 88, No. 12, pp. 2614-2621.
Ferrara, et al., The Journal of Physical Chemistryin. "Physicochemical Characterization of AlCl3-1-Ethyl-3-methylimidazolium Chloride Ionic Liquid Electrolytes for Aluminum Rechargeable Batteries" (2017), 121, pp. 26607-26614.
Gao, L. et al.., Acta Physico-Chimica Sinica, "Electrodeposition of Aluminum from AlCl3/Et3NHCl Ionic Liquids" vol. 24, Issue 6 (Jun. 2008), pp. 939-944.
Gilbert, et al., Oil I & Gas Science and Technology, "Chloroaluminate Ionic Liquids: from their Structural Properties to their Applications in Process Intensification" Rev. IFP, vol. 62 (2007), No. 6, pp. 745-759.
Gu, et al., Energy Storage Materials, "Confirming reversibleAl3 þ storage mechanism through intercalation of Al3 + into V2O5 nanowires in a rechargeable aluminum battery" 2017, 6, pp. 9-17.
Kasavajula, et al., "Nano and bulk-silicon-based insertion anodes for lithium-ion secondary cells" Journal of Power Sources 163, (2007), pp. 1003-1039.
Kravchyk, et al., "Efficient Aluminum Chloride-Natural Graphite Battery" Chemistry of Materials 29, (2017), pp. 4484-4492.
Lee, et al., Hypostatic instability of aluminum anode in acidic ionic liquid for aluminum-ion battery, Nanotechnology 29 (2018), 7pp.
Li, et al., "Rechargeable Aluminum-Ion Battery Based on MoS2 Microsphere Cathode", ACS Applied Materials and Interfaces (2018), 10, pp. 9451-9459.
Liu, et al., "Advanced Energy Storage Devices: Basic Principles, Analytical Methods, and Rational Materials Design", Advanced Science 5, 1700322 (2018), pp. 1-19.
D.M. MacArthur, "The Proton Diffusion Coefficient for the Nickel Hydroxide Electrode", Journal of the Electrochemical Society, vol. 117, No. 6, (1970), pp. 729-733.
Nemanich, et al., "Raman scattering from intercalated donor compounds of graphite" Physical Review B vol. 16, No. 6, Sep. 15, 1977, pp. 2965-2672.
Özmen-Monkul, et al., "The first graphite intercalation compounds containing tris(pentafluoroethyl)trifluorophosphate" Carbon 48, (2010), pp. 3205-3210.
Schmuelling, et al., "X-ray diffraction studies of the electrochemical intercalation of bis(trifluoromethanesulfonyl)imide anions into graphite for dual-ion cells", Journal of Power Sources 239 (2013), pp. 563-571.
Schoetz, et al., "State of the Art of Rechargeable Aluminum Batteries in Non-Aqueous Systems", Journal of the Electrochemical Society, 164 (2017), pp. A3499-A3502.
Sole et al., "In situ Raman study of lithium-ion intercalation into microcrystalline graphite" Faraday Discuss 172, (2014), pp. 223-237.
Su, et al., "Electrodeposition of aluminum wires from the Lewis acidic AlCl3/trimethylamine hydrochloride ionic liquid without using a template" Electrochemistry Communications 34, (2013) pp. 170-173.
Takahashi et al., "Molecular Orbital Calculations and Raman Measurements for I-Ethyl-3-methylimidazolium Chloroaluminates" Inorganic Chemistry, vol. 34, No. 11, (1995) pp. 2990-2993.
Takahashi, et al., "Technological and scientific issues of room-temperature molten salts" Plasmas & Ions 2, (1999), pp. 91-105.
Wang, et al., "Advanced rechargeable aluminium ion battery with a high-quality natural graphite cathode" Nature Communications Article, (2017), pp. 1-7.
Wang, et al., "Interference enhancement of Raman signal of graphene", Applied Physics Letters 92, 043121, (2008), 4 pages.
Wang, et al., "Dense graphene papers: Toward stable and recoverable Al-ion battery cathodes with high volumetric and areal energy and power density" Energy Storage Materials 13, (2018), pp. 103-111.

* cited by examiner

FIGURE 7 (a) to (d)
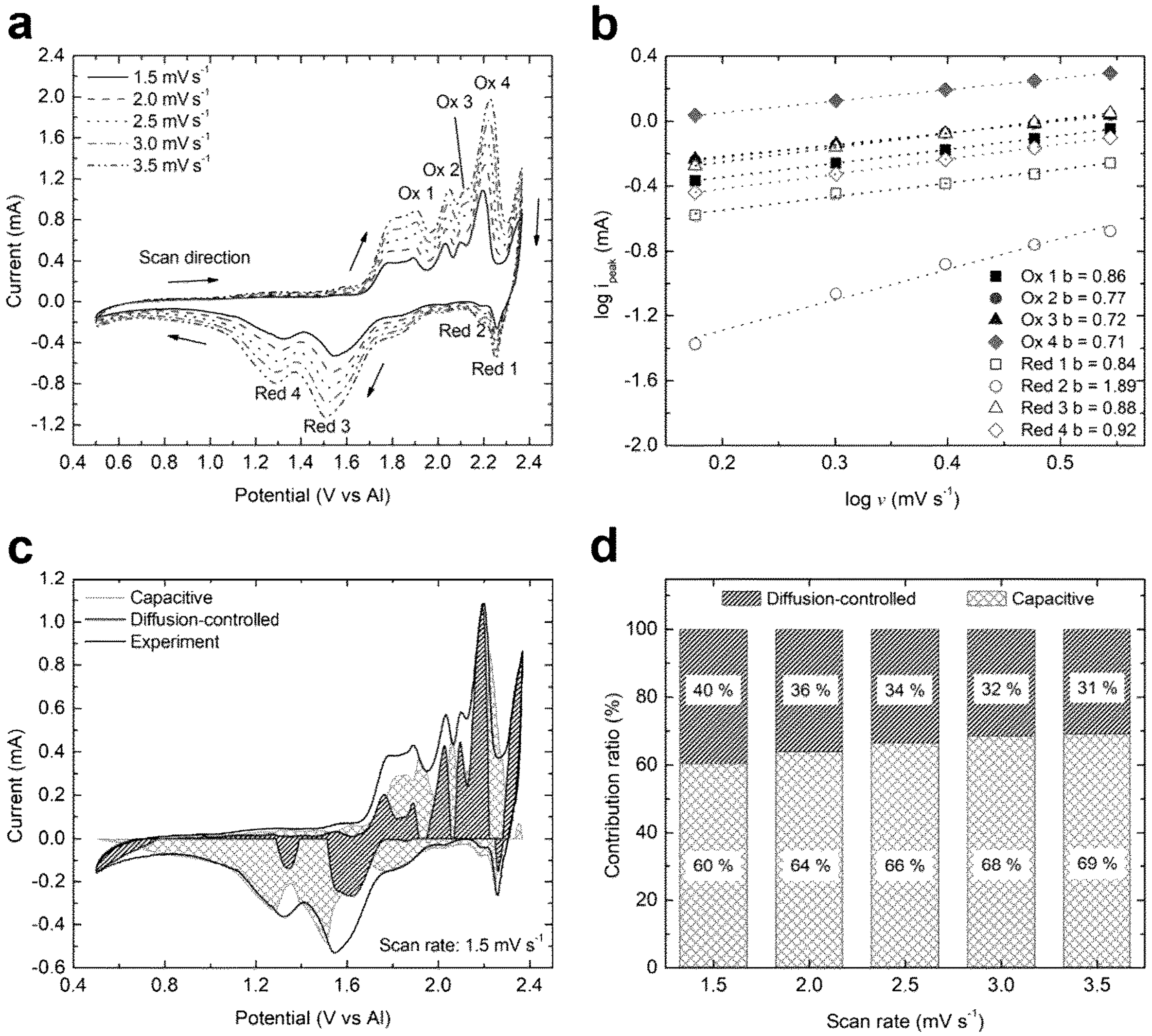

FIGURE 7 (e) to (g)
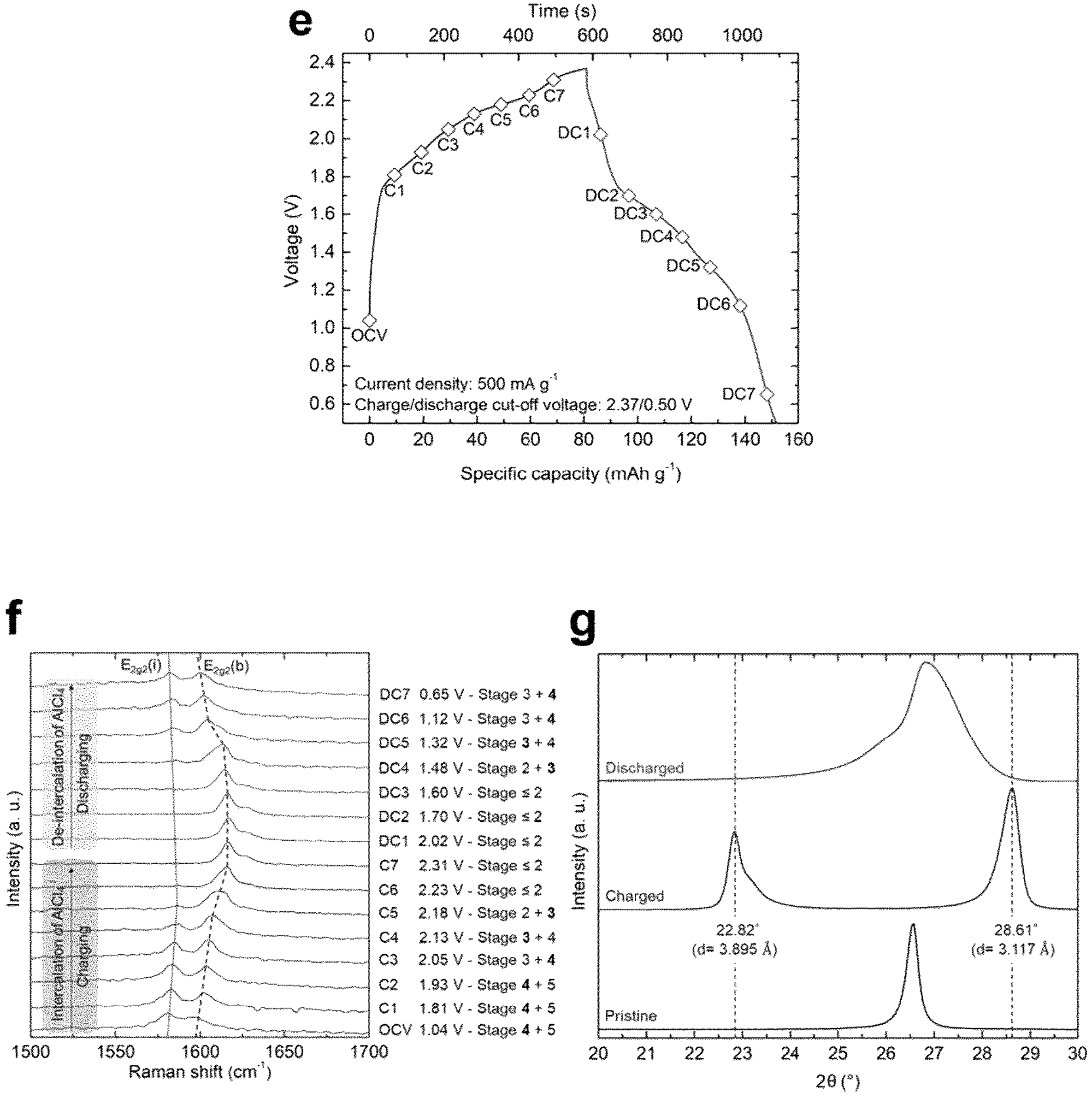

ALUMINUM-ION BATTERY USING ALUMINUM CHLORIDE/TRIMETHYLAMINE IONIC LIQUID AS ELECTROLYTE

CROSS REFERENCE TO RELATED APPLICATIONS

This application is a 371 of PCT Application No. PCT/CA2021/050210 filed on Feb. 24, 2021, which claims the benefit of U.S. Provisional Application No. 62/980,646, filed on Feb. 24, 2020, the entire contents of which are hereby incorporated by reference herein.

TECHNICAL FIELD

The present technology relates to batteries, and more specifically, to aluminum-ion (Al-ion) electrochemical cells using ionic liquids as electrolyte, aluminum metal as anode, and compatible materials as cathode. The application also further relates to Al-ion batteries containing the electrochemical cells and to their uses.

BACKGROUND

The growing awareness of the crucial need to protect the urban environment and, subsequently, increased motivation for compliance with environmental regulations around the world have led to notable advances in harvesting renewable energy sources, e.g., solar and wind energy. To overcome the intermittent nature of these sources, there is an urgent need for novel energy storage technologies made of low-cost, earth-abundant, and high-performance components. In this regard, rechargeable aluminum (Al)-based energy storage devices are notably promising due to low material cost, ease of handling in the ambient environment, high abundance, and high theoretical gravimetric and volumetric capacity of aluminum.

A significant body of research over the past decade has been devoted to the development of Al batteries. Initiated by the pioneering study by Lin et al., in *Nature* 2015, 520, 324, who reported an Al/3D-graphene-foam battery with a specific capacity of 60 mAh $g^{-1}$ across 7500 cycles, Al batteries employing carbonaceous/graphitic cathodes have received substantial attention due to favorable battery performance such as excellent cyclability, rate capability, and high discharge voltage (see Y. Zhang, et al., *Adv. Mater.* 2018, 30, 1706310).

Subsequent studies employing various carbonaceous/graphitic cathodes, including defect free graphene aerogel (H. Chen, et al., *Adv. Mater.* 2017, 29, 1605958), graphene nanoribbons on highly porous 3D graphene foam (X. Yu, et al., *Adv. Mater.* 2017, 29, 1604118), graphene microflowers (H. Chen, et al., *Adv. Energy Mater.* 2017, 7, 1700051), natural graphite (D. Wang et al., *Nat. Commun.* 2017, 8, 14283; and M. C. Huang et al., *Energies* 2018, 11, 12), 3D graphite foam (Y. Wu et al., *Adv. Mater.* 2016, 28, 9218), polypyrenes (M. Walter, et al., *Adv. Mater.* 2018, 30, 1705644), zeolite templated carbon (N. P. Stadie et al., *ACS Nano* 2017, 11, 1911), edge-rich graphene paper (Q. Zhang et al., *Energy Storage Mater.* 2018, 15, 361), carbon nanoscrolls (Z. Liu et al., *ACS Nano* 2018, 12, 8456), graphene nanoplatelets (GNPs) (Y. Uemura et al., *ACS Appl. Energy Mater.* 2018, 1, 2269), and pyrolytic graphite (G. A. Elia et al., *ACS Appl. Mater. Interfaces* 2017, 9, 38381), were also reported to demonstrate promising results.

Across various electrolyte systems employed, chloroaluminate ionic liquids (ILs) formed through a mixture of Lewis acidic aluminum chloride ($AlCl_3$) and Lewis basic dialkylimidazolium chlorides (in particular, 1-ethyl-3-methylimidazolium chloride; EMIMCl, and 1-butyl-3-methylimidazolium chloride; BMIMCl) have accounted for nearly 80% of existing literatures on non-aqueous Al batteries (see Y. Zhang et al. above). Despite the good performance obtained using these electrolytes, the high cost and small-scale productivity of dialkylimidazolium chlorides remarkably diminish their potential towards large-scale application and commercialization.

To mitigate this issue, a few research studies have focused on developing Al batteries using low-cost electrolytes by combining $AlCl_3$ and cost-effective Lewis basic ligands such as urea (see H. M. A. Abood et al., *Chem. Commun.* 2011, 47, 3523; M. Angell et al., *Proc. Natl. Acad. Sci.* 2017, 114, 834; and K. L. Ng et al., *Electrochim. Acta* 2019, 327, 135031), and triethylamine hydrochloride (TEAHCl) (see H. Xu et al., *Energy Storage Mater.* 2018, 1; and X. Dong et al., *Carbon N. Y.* 2019, 148, 134). However, the resulting Al/graphite batteries from $AlCl_3$-urea electrolyte showed modest performance in terms of rate performance (50-78 mAh $g^{-1}$, at 100-1000 mA $g^{-1}$) and cycle life (1000 cycles). In contrast, Al batteries employing $AlCl_3$-TEAHCl electrolyte demonstrated comparable battery performance with dialkylimidazolium chloride-based system, reporting a specific capacity of 112 mAh $g^{-1}$ at 5000 mA $g^{-1}$.

SUMMARY

According to one aspect, the present technology relates to an electrochemical cell comprising an electrolyte, an anode and a cathode, wherein the electrolyte comprises $AlCl_3$ and trimethylamine hydrochloride, and wherein the anode comprises metallic aluminum and the cathode comprises a cathode electrochemically active material. In one embodiment, the $AlCl_3$ and trimethylamine hydrochloride form an ionic liquid.

According to one embodiment, the molar ratio of $AlCl_3$ to trimethylamine hydrochloride is between 1.5 and 2, or within the range of 1.6 to 1.9, or within the range of 1.7 to 1.8.

According to another embodiment, the electrolyte consists of $AlCl_3$ and trimethylamine hydrochloride forming an ionic liquid. In an alternative embodiment, the electrolyte further comprises a co-solvent, e.g. 1,2-dichloroethane.

According to a further embodiment of the electrochemical cell, the cathode electrochemically active material is selected from a carbonaceous or graphite material, a metal or non-metal sulfide, elemental sulfur, elemental selenium, a metal oxide, a conductive polymer, a MXene, and combinations thereof.

In one embodiment, the cathode electrochemically active material is a carbonaceous or graphite material is selected from templated carbon, pyrolytic graphite, natural graphite, expandable graphite, carbon nanoscrolls, carbon nanotubes, graphene nanoplatelets, graphene aerogels, 3D-graphene foam, graphene papers, graphene microflowers, and combinations thereof. In one particular embodiment, the cathode electrochemically active material comprises graphene nanoplatelets, preferably having an aspect ratio (lateral size/thickness) between 500 and 1600, or between 750 and 1250, or of about 1000. In another embodiment, the cathode electrochemically active material comprises graphite, for instance comprising pyrolytic (e.g. pristine or heat-treated), natural (e.g. ultrasonicated) or exfoliated graphite (e.g. sonicated microwave-exfoliated graphite). In the case where the graphite is exfoliated graphite, the cathode may be a free-standing cathode.

In another embodiment, the cathode electrochemically active material is a metal or non-metal sulfide selected from $SeS_2$, CuS, NiS, $Ni_3S_2$, $TiS_2$, $SnS_2$, $SeSnS_2$, $MoS_2$, $Mo_6S_8$, $VS_4$, $VS_2$, $FeS_2$, $Co_3S_4$, $Co_9S_8$, and SnS, for instance, the non-metal sulfide is $SeS_2$. In another embodiment, the cathode electrochemically active material comprises elemental sulfur, elemental selenium, or a combination thereof.

In a further embodiment, the cathode electrochemically active material is a metal oxide selected from vanadium oxides (e.g., $VO_2$ or $V_2O_5$). In another embodiment, the cathode electrochemically active material is a metal oxide of spinel configuration having the formula:

$$(Al_xM_{1-x})_2(M'O_4)_3$$

wherein:

M represents $M_2{}^aM_3{}^bM_4{}^c$;

$M_2$ is a bivalent metal element selected from the group consisting of Mg, Ca, Sr and Ba;

$M_3$ is a trivalent metal element selected from the group consisting of Sc, Y, Ga and In; and $M_4$ is a tetravalent metal element selected from the group consisting of Zr and Hf;

M' is a hexavalent metal element (e.g. W or Mo); and a, b, c and x are such that $0 \leq a < 1$, $0 \leq b < 1$, $c = a$, and $0 \leq x < 1$, wherein:

$(2a/(1-x)+3b/(1-x)+4c/(1-x))=3$.

In yet another embodiment, the cathode electrochemically active material is a conductive polymer selected from poly-pyrene, phenanthrenequinone-based organic compounds, polypyrrole, polythiophene, and the like.

In a further embodiment, the cathode electrochemically active material is a 2D-MXene of the formula $M''_{n+1}C_n$, wherein M" is a transition metal (e.g. Ti, V) and n is equal to or greater than 1.

In any of the above embodiments, the cathode may further comprise an electronically conductive carbon (e.g. carbon black, acetylene black, carbon nanofibers, mesoporous carbon, etc.). In another embodiment, the cathode further comprises a binder (e.g. sodium alginate).

In another embodiment, the electrochemical cell further comprises a separator (e.g. a glass microfiber separator).

According to another aspect, the present technology further relates to a battery comprising at least one electrochemical cell as defined herein. In one embodiment, the battery is an aluminum-ion battery. In another embodiment the battery is for use in supplying electric power to a consumer electronic device, or for use in supplying electric power to a hybrid or electric vehicle, or for use in storing electrical energy within an electrical power grid.

According to a further aspect, the present technology further relates to a method of supplying electric power to an external device comprising:

(a) providing an electrochemical cell as defined herein;

(b) connecting the electrochemical cell to the external device; and (c) allowing the electric current to flow from the electrochemical cell to the external device.

In one embodiment, the electrochemical cell is a component of a battery. In another embodiment, the external device is a consumer electronic device, or the external device is a hybrid or electric vehicle. In another embodiment, the battery is used in storing electrical energy within an electrical power grid, and the device is connected to the electrical power grid.

BRIEF DESCRIPTION OF THE DRAWINGS

FIG. 7 shows a) cyclic voltammograms of GNP-1000 working electrode at a scan rate of 1.5-3.5 mV $s^{-1}$; b) corresponding log $i_{peak}$ versus log v plots to evaluate the b value of redox peaks in part a; c) deconvoluted capacitive and diffusion-controlled contributions in the CV curve of GNP-1000 at 1.5 mV $s^{-1}$; d) capacitive and diffusion-controlled contribution ratios across scan rates of 1.5 to 3.5 mV $s^{-1}$; e) charging and discharging voltages at which the in situ Raman spectra were recorded; f) corresponding in situ Raman spectra recorded during the charge-discharge of GNP-1000 cathode at 500 mA $g^{-1}$; and g) ex situ X-ray diffraction patterns of GNP-1000 in pristine, fully charged and fully discharged states.

DETAILED DESCRIPTION

Figure 1:
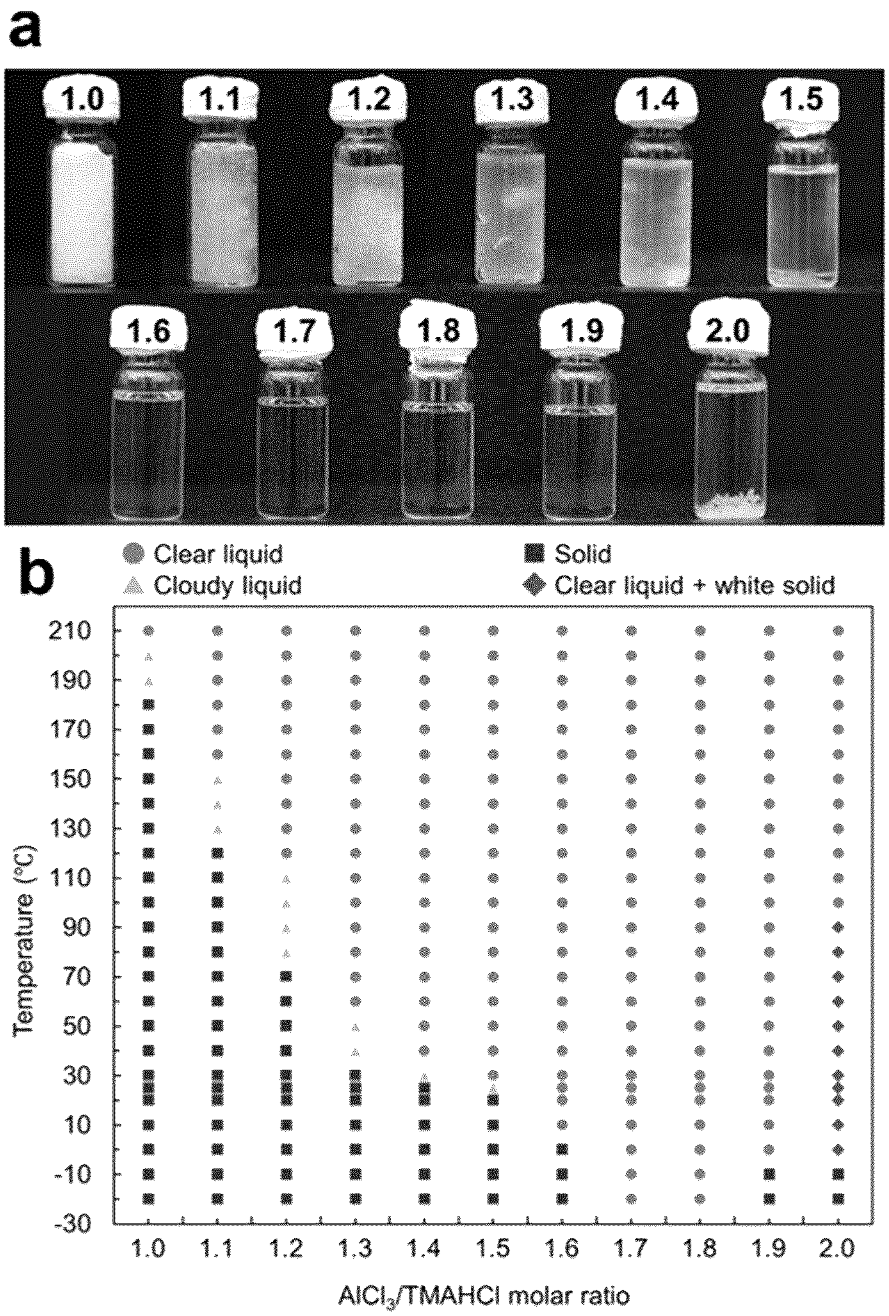
FIG. 1 presents (a) photographs of $AlCl_3$-TMAHCl ionic liquid electrolyte at various molar ratio (r=1.0-2.0) at 25° C. and (b) the physical state of the same molar ratios of $AlCl_3$-TMAHCl ionic liquids from −20 to 210° C.

All technical and scientific terms and expressions used herein have the same definitions as those commonly understood by the person skilled in the art relating to the present technology. The definition of some terms and expressions used herein is nevertheless provided below for clarity purposes.

When the term "approximately" or its equivalent term "about" are used herein, it means approximately or in the region of, and around. When the terms "approximately" or "about" are used in relation to a numerical value, it modifies it; for example, it could mean above and below its nominal value by a variation of 10%. This term may also take into account the probability of random errors in experimental measurements or rounding.

To at least partially overcome the challenges associated with prior art batteries, the inventors have adopted the use of a new ionic liquid as electrolyte in the battery of the present technology.

Without wishing to be bound by theory, the following discusses the theoretical aspects behind the present approach in developing this new generation of Al-ion batteries.

Desired features of room-temperature ionic liquids (RTILs), such as a wide electrochemical stability window, low vapor pressure, and reasonably high electrochemical conductivity, are very promising in the development of new energy storage devices with high capacity. Among them, RTILs formed by a combination of aluminum chloride ($AlCl_3$) with dialklylimidazolium chloride have been considered as the most promising candidates for Al-based batteries. By varying the molar ratio of $AlCl_3$ to dialkylimidazolium chloride ($X_{AlCl3}$), intrinsic properties such as Lewis acidity/basicity, types of ionic species present, melting point, conductivity and electrochemical stability window of the electrolytes can be modulated. In Lewis basic melt where $X_{AlCl3}<0.5$, the ionic species present are $Cl^-$ (in access) and $AlCl_4^-$, while in Lewis acidic melt where $X_{AlCl3}>0.5$, several species such as $AlCl_4^-$, $Al_2Cl_7^-$, $Al_3Cl_{10}$, $Al_4Cl_{13}^-$ can form depending on $X_{AlCl3}$. At a composition of $X_{AlCl_3}=0.5$, such melt is called neutral melt and only $AlCl_4^-$ is present. Since $AlCl_4^-$ ions cannot be reduced within the potential range in most applications, electrodeposition of aluminum is possible only in acidic melts following the equation:

$$4Al_2Cl_7^- + 3e^- = Al + 7AlCl_4^- \quad (1)$$

When graphitic materials are used as the active materials in the cathode of an Al-based electrochemical cell, intercalation of $AlCl_4^-$ in between graphene layers during charging occurs:

$$C_n + AlCl_4^- \rightleftharpoons C_n[AlCl_4] + e \quad (2)$$

Hence, the overall redox reaction in a typical Al/graphite cell using Lewis acidic $AlCl_3$-dialklylimidazolium chloride electrolyte follows:

$$3C_n + 4Al_2Cl_7^- = Al + 3C_n[AlCl_4] + 4AlCl_4^- \quad (3)$$

However, the use of expensive [EMIm]Cl raised significant cost issues, which hindered the large-scale commercialization and industrialization of Al-ion batteries.

In aluminum batteries employing chloroaluminate ionic liquids (ILs), the electrolyte is not only a medium for ion transportations, but it is also an active material, i.e. a liquid anolyte. Several studies including previous work by the inventors have shown that the attainable cell-level capacity is deterministically limited by the concentration of $Al_2Cl_7^-$ in chloroaluminate ILs, and IL analogs. In the context of the present work, the cell-level specific capacity and the maximum energy density achievable was calculated for various chloroaluminate IL-based Al batteries employing carbonaceous and graphitic cathode materials. Given the same $AlCl_3$/XCl (X: organic base group) molar ratio, Al battery employing $AlCl_3$-TMAHCl electrolyte is estimated to deliver the highest cell-level specific capacity ($Q_{cell}$), followed by $AlCl_3$-TEAHCl, $AlCl_3$-EMIMCI, and lastly $AlCl_3$-BMIMCI. The cell-level volumetric capacity ($q_{cell}$) also showed a similar trend.

For comparison purposes across various systems, reported literature on fast-charging Al/graphitic batteries employing various $AlCl_3$—XCl electrolytes was analyzed and compared to Al/GNP to the present battery using $AlCl_3$-TMAHCl electrolyte and the latter was determined to offer the highest experimentally achievable $Q_{cell}$ and $q_{cell}$, as well as cell-level specific-($E_{cell}$) and volumetric energy density ($e_{cell}$). Noticeably, despite a high cathodic capacity of 382 mAh $g^{-1}$, the cell-level specific capacity of Al/graphite battery using the most widely used electrolyte ($AlCl_3$/EMIMCI=1.3 by mole) is only limited to ~18 mAh $g^{-1}$.

To determine the upper limit of the energy density achievable by Al/graphitic batteries employing $AlCl_3$—XCl electrolytes, a discharge voltage of 2 V and molar ratio (r) of 2 were used to calculate the maximum $E_{cell}$, and $e_{cell}$. The max $E_{cell}$ for $AlCl_3$-TMAHCl, $AlCl_3$-TEAHCl, $AlCl_3$-EMIMCI, and $AlCl_3$-BMIMCI systems is estimated to be around 97, 88, 86, and 81 Wh $kg^{-1}$, respectively, while max $e_{cell}$ is estimated to be around 144, 121, 121, and 109 Wh $cm^{-3}$, respectively. Taking the weight and volume of other non-electroactive battery components into consideration (for simplification ~50% of total weight in Li-ion batteries is assumed to be 50 vol %), the practically achievable cell-level specific and volumetric energy density of Al/graphite batteries employing $AlCl_3$-TMAHCl electrolyte are estimated to be ~50 Wh $kg^{-1}$ and ~70 Wh $cm^{-3}$, respectively. These values are on par with the practical specific energy density of lead acid (25-55 Wh $kg^{-1}$) and nickel metal hydride battery (50-70 Wh $kg^{-1}$). In addition to higher theoretical capacity and energy density, it is also predicted that a lesser amount of $AlCl_3$-TMAHCl IL is required per unit mass and unit volume of carbonaceous and graphitic materials employed in the cathode. Coupled with the low cost of TMAHCl relative to other XCls, the above favorable factors remarkably enhance the potentials to scale-up Al batteries employing $AlCl_3$-TMAHCl ILs.

The present novel Al battery technology comprising affordable aluminum trichloride ($AlCl_3$)/alkylamine hydrochloride salt (trimethylamine hydrochloride) as the electrolyte, aluminum metal as the anode, and graphitic (e.g., graphene nanoplatelets) or non-graphitic materials (e.g. $SeS_2$) as the cathode was developed. In comparison with batteries employing existing chloroaluminate ionic liquids, the Al batteries employing the present electrolyte surpass the state-of-the-art batteries in terms of maximum cell-level specific and volumetric capacities, and fast-charging-slow-discharging rate performance. Because the components employed in this novel Al battery are inexpensive, non-hazardous and widely available, large-scale production and application become economically viable. A wide variety of applications ranging from energy storage in consumer electronics to electric vehicles to grid storage is considered.

Accordingly, the present technology relates to an aluminum-ion electrochemical cell comprising an electrolyte between an anode and a cathode, where the electrolyte comprises $AlCl_3$ and trimethylamine hydrochloride, and wherein the anode comprises metallic aluminum and the cathode comprises a cathode electrochemically active material. The electrochemical cell optionally further comprises a separator between the anode and cathode, in which the electrolyte is impregnated (e.g., a glass microfiber separator).

Especially, the $AlCl_3$ and trimethylamine hydrochloride in the electrolyte form an ionic liquid. For instance, the molar ratio of $AlCl_3$ to trimethylamine hydrochloride is between 1.5 and 2, preferably within the range of 1.6 to 1.9, or of 1.7 to 1.8. In one example, the electrolyte consists of $AlCl_3$ and trimethylamine hydrochloride (including its resulting products), for instance, wherein the electrolyte comprises less than 5% by weight, or less than 2% by weight of other elements or impurities). In other examples, the electrolyte further comprises an inert co-solvent, such as 1,2-dichloroethane. The concentration of co-solvent, if present, may be within the range from 1% to 30%, from 1% to 20%, or from 1% to 15%, or from 5% to 10%, or of 5% or less, or from 1% to 5%, all by volume in the total volume of electrolyte.

In this electrochemical cell, the cathode comprises a cathode active material electrochemically compatible with aluminum as the anode active material. More specifically the cathode comprises an electrochemically active material selected from:

- a carbonaceous or graphite material (such as templated carbon, pyrolytic graphite, natural graphite, expandable graphite, carbon nanoscrolls, carbon nanotubes, graphene nanoplatelets, graphene aerogels, 3D-graphene foam, graphene papers, graphene microflowers, and combinations thereof);
- metal or non-metal sulfide (such as $SeS_2$, CuS, NiS, $Ni_3S_2$, $TiS_2$, $SnS_2$, $SeSnS_2$, $MoS_2$, $Mo_6S_8$, $VS_4$, $VS_2$, $FeS_2$, $Co_3S_4$, $Co_9S_8$, and SnS);
- elemental sulfur, elemental selenium, and a combination (including a composite) thereof;
- a metal oxide like vanadium oxides (e.g. $VO_2$ or $V_2O_5$) or a metal oxide of spinel configuration having the formula;

$$(Al_xM_{1-x})_2(M'O)_3$$

wherein:

M represents $M_2^aM_3^bM_4^c$, wherein:

- $M_2$ is a divalent metal element selected from the group consisting of Mg, Ca, Sr and Ba;
- $M_3$ is a trivalent metal element selected from the group consisting of Sc, Y, Ga and In; and
- $M_4$ is a tetravalent metal element selected from the group consisting of Zr and Hf;

M' is a hexavalent metal element (such as W or Mo); and a, b, c and x are such that $0 \le a < 1$, $0 \le b < 1$, $c = a$, and $0 \le x < 1$, wherein:

$$(2a/(1-x)+3b/(1-x)+4c/(1-x))=3;$$

- a conductive polymer (such as polypyrene, phenanthrenequinone-based organic compounds, polypyrrole, polythiophene, and the like);
- a MXene (such as 2D-MXene of the formula $M''_{n+1}C_n$, wherein M'' is a transition metal (e.g. Ti, V) and n is equal to or greater than 1);
- or a combination thereof.

For instance, the electrochemically active cathode material comprises graphene nanoplatelets, preferably graphene nanoplatelets having an aspect ratio (lateral size/thickness) between 500 and 1600, or between 750 and 1250, or of about 1000.

Alternatively, the electrochemically active material comprises a graphite which may be pyrolytic, natural or exfoliated graphite. On example includes pyrolytic graphite which is pristine or heat-treated. Another example is natural graphite, which can be natural or ultrasonicated. Preferably, the graphite is a sonicated or heat-treated graphite. A further example of a cathode active material is sonicated microwave-exfoliated graphite. For instance, the cathode comprises sonicated microwave-exfoliated graphite as electrochemically active material and the cathode is a free-standing cathode.

In another preferred example, the electrochemically active materials of interest are elemental sulfur, elemental selenium, Se—S composites, $MoS_2$ and $SeS_2$, preferably $SeS_2$ and Se—S composites. For instance, the electrochemically active material may be an Se—S composite further comprising a mesoporous carbon, such as an ordered mesoporous carbon.

The cathode material as defined herein may further comprise, in addition to the electrochemically active material, electronically conductive carbon, for instance, carbon black, acetylene black, carbon nanofibers, mesoporous carbon, etc. The cathode material may also further comprise a binder (such as sodium alginate).

A battery is also contemplated, where such battery comprises at least one electrochemical cell as defined herein, e.g., an aluminum-ion battery. The battery surpasses the state-of-the-art in terms of cell-level specific and volumetric capacities across various cathode materials, and higher concentration of electroactive species (in mol per unit mass, and in mol per unit volume of electrolyte). Because the components used in this novel Al-ion battery are inexpensive, non-hazardous and widely available, large-scale production and application become economically viable.

The present batteries and electrochemical cells may be used in any method or device requiring electric power storage and/or supply. General uses include supplying electric power to a consumer electronic device or to a hybrid or electric vehicle or storing electrical energy within an electrical power grid, e.g., large-scale grid storage.

For instance, the present batteries when used in consumer electronics could address potential safety issues (fire/explosion hazard) associated with lithium-ion batteries. The non-hazardous nature of the components used in the present battery technology ensures an overall ease of handling during application as well as transportation. In addition, the economic aspects of this battery that uses widely available components (e.g., aluminum, graphite, and trimethylamine hydrochloride) could significantly lower the production costs.

With respect to the use in hybrid of electric vehicles, it is demonstrated in the Examples, that $AlCl_3$-TMAHCl ILs exist in liquid form across a wide range of temperatures. Accompanied by the low partial pressure of the electrolyte, hybrid/electric vehicles that utilize the present Al batteries could potentially handle extreme weather conditions. Similarly, a marked production cost reduction is expected over conventional Li-ion and nickel-metal hydride batteries.

Furthermore, in contrast to current energy storage using Li-based materials, the components used in the present Al batteries do not pose geographical limitations. Such batteries ensure a lower cost, safety, reliability, and materials abundance. In addition, the theoretical energy density for Al-ion batteries (1060 Wh/kg) is significantly higher than that of lithium-ion batteries (406 Wh/kg). A higher capacity is theoretically attainable through appropriate engineering of the cathode materials.

Accordingly, also contemplated herein is a method of supplying electric power to an external using the present electrochemical cells comprises:

(a) providing an electrochemical cell as defined according to any of the aforementioned embodiments;

(b) connecting the electrochemical cell to the external device; and (c) allowing the electric current to flow from the electrochemical cell to the external device.

For instance, the electrochemical cell is a component of a battery. In some examples of this method, the external device is a consumer electronic device or a hybrid or electric vehicle. Alternatively, the battery is used in storing electrical energy within an electrical power grid, and the device is connected to the electrical power grid.

EXAMPLES

The following non-limiting examples are illustrative embodiments and should not be construed as further limiting the scope of the present invention. These examples will be better understood with reference to the accompanying figures.

Example 1: Materials and Equipment (a) Materials

Anhydrous aluminum chloride ($AlCl_3$, 99.985%), trimethylamine hydrochloride (TMAHCl, 98%) and carbon black (CB; Super-P™) as conductive agent 99%) were supplied by Alfa Aesar (USA). Aluminum foil (thickness of 50 μm, 99.999%) and molybdenum sheet (thickness of 130 μm, 99.95%) were purchased from Beijing Loyaltarget Tech. Co., Ltd. (China). Triethylamine hydrochloride (TEAHCl, ≥99%) was obtained from Acros Organics (USA), urea (≥99.5%) was from Bioshop Canada Inc. (Canada), and sodium alginate (SA; food-grade) was from Landor Trading Co. Ltd. (Canada). CMK-3 (98%), an ordered mesoporous carbon, was acquired from XFNano (China).

Graphene nanoplatelets (GNPs) with a thickness of 15 nm (Grade-H) and lateral sizes of 5 and 15 μm, were purchased from XG Sciences (USA). GNPs with a thickness of 6-8 nm and lateral sizes of 15 and 25 μm were obtained from Strem Chemicals (USA). The corresponding GNP aspect ratio was calculated by dividing the lateral size with the thickness. For GNPs with a thickness of 6-8 nm, a thickness of 7 nm was utilized in the calculation of aspect ratio. The GNPs were labelled according to their resulting respective aspect ratio: GNP-333 (5 μm/15 nm), GNP-1000 (15 μm/15 nm), GN-2143 (15 μm/7 nm), and GNP-3571 (25 μm/7 nm). Glass microfiber separators (Whatman GF/A), sulfur (S, 99.98%), and selenium (Se, 99.99%) were purchased from Sigma-Aldrich Co. (USA).

(b) Purification of Raw Materials

Prior to usage, the as-received Al foil was ultrasonicated in anhydrous ethanol (5 min.) followed by dipping in 8M $HNO_3$ (5 min.) to remove surface impurities. The foil was rinsed in water until neutral pH was achieved. It was then dried in acetone and transfer to an argon filled glovebox ($O_2$ and $H_2O$ level <1 ppm).

All glassware and components such as magnetic stir bars used in this study were vacuum dried at 80° C. overnight before being stored in the glovebox.

TMAHCl, TEAHCl and urea were vacuum dried at 80-90° C. overnight to remove potential moisture in the raw materials before use.

Example 2: Preparation Methods (a) Electrolytes $AlCl_3$-TMAHCl, -TEAHCl, and -urea electrolytes were prepared by slowly mixing the respective compound with anhydrous $AlCl_3$ (with respect to the designated composition) in a glass beaker under constant magnetic stirring in an argon-filled glovebox overnight. In a typical electrolyte preparation (e.g., for $AlCl_3$/TMAHCl=1.7 by mole), 9.49 g of $AlCl_3$ and 4.00 g of TMAHCl were used. For the $AlCl_3$-TMAHCl electrolyte used in long-term cyclability test, the electrolyte was subjected to vacuum for 10 min to further remove impurities, such as HCl and colored organic impurities. The density of $AlCl_3$-TMAHCl ionic liquids (ILs) was calculated by determining the mass of the IL in a 5 ml volumetric flask at 25° C. in the glovebox.

(b) Cathodes

The selenium-sulfur/CMK-3 composite (Se—S@CMK) was prepared by mixing all components (S, Se and CMK-3) in mortar and pestle, and further homogenized using a vortex mixer. The mixture was then transferred into an autoclave and heated to 260° C. for 24 hours, followed by natural cooling to room temperature. The mass fraction of Se—S in Se—S@CMK composite was approximately 0.5.

Typically, GNP, $SeS_2$ and Se—S@CMK slurries (a 75:15:10 mass ratio for (GNP or $SeS_2$ or Se—S@CMK):SA:CB) were prepared by mixing 0.75 g of GNPs, $SeS_2$, or Se—S@CMK respectively, with 0.15 g of SA, and 0.10 g of CB with 8-10 ml of distilled water. The mixture was magnetically stirred overnight until a homogenous slurry was obtained. This slurry was doctor-bladed onto a piece of molybdenum tab (~1×5 cm, width×length). A piece of paper tape was used to limit the area of coating to ~1 $cm^2$ (1×1 cm). After brief drying at 40° C. for 5 min, the tape was removed and the remaining adhesive was cleaned in acetone. Prior to determining the actual loading, the GNP-coated or $SeS_2$-coated Mo tab was dried overnight under vacuum at 80° C. to remove any remaining moisture. The actual loading of the active material was determined by dividing the weight difference of the coated and uncoated Mo tab with the coating area (determined by Image-J™) and multiplying by the mass fraction of GNP in the slurry of 0.75.

(c) Electrochemical Cells

Coin cells (CR 2032) were assembled by stacking an Al foil anode (~1.6 cm in diameter), a layer of glass microfiber separator (~1.6 cm in diameter) with either a GNP cathode (~0.7 mg $cm^{-2}$, ~1 $cm^2$), $SeS_2$ cathode (~1.3 mg $cm^{-2}$, ~1 $cm^2$) or Se—S@CMK cathode (~0.7 mg $cm^{-2}$, ~1 $cm^2$), and injecting approximately 350 μL of electrolyte ($AlCl_3$/TMAHCl=1.7, by mole). To minimize the contact of the electrolyte with the coin cell's terminals, a piece of Mo sheet (~1.6 cm in diameter) was placed in between the anodic and cathodic side of the respective terminal.

Pouch cells were fabricated with GNP cathode of designated loading (0.5 to 1.5 mg $cm^{-2}$), L-shaped Al foil anode (area facing the cathode: 2.5×2.0 cm), and two layers of glass microfiber separator with 1 mL of electrolyte of designated $AlCl_3$/TMAHCl molar ratio.

Example 3: Characterization and Electrochemical Measurement Methods (a) Electrochemical Performance Prior to subjecting the Al/GNP cells to designated experimental conditions, all assembled cells were galvanostatically cycled at 500 mA $g^{-1}$ for 25 cycles to stabilize the GNP electrode. Galvanostatic charging and discharging tests were then conducted using a multichannel battery tester (CT-4008, Neware). Cyclic voltammetry and electrochemical impedance spectroscopy (EIS) measurements were performed using a VersaSTAT 3™ potentiostat (Princeton Applied Research). To determine rate capability, Al/GNP cell was cycled at various current densities from 1000 to 10000 mA $g^{-1}$. The charge/discharge current density for long-term cyclability test was set at 2000 mA $g^{-1}$. Fast charging and slow discharging behavior were evaluated using a charge current density of 4000 mA $g^{-1}$ whereas the discharge current densities were varied from 4000 to 100 mA $g^{-1}$. To evaluate the cell performance at various temperatures, an Al/GNP cell was cycled at 500 mA $g^{-1}$ in an environmental chamber with varying temperatures ranging from −10 to 60° C. To stabilize the temperature, the cell was kept for more than 30 minutes at each designated temperature prior to cycling. Unless otherwise mentioned, the cells that were subjected to the tests above employed GNP-1000 (~0.7 mg $cm^{-2}$) as the cathode, $AlCl_3$/TMAHCl=1.7 (by mole) as the electrolyte, and the charge/discharge cut-off voltages of 2.37/0.50 V, respectively. For Al/$SeS_2$ system, the cell was cycled at a current density of 50 mA $g^{-1}$ with charge and discharge cut-off voltage at 1.8 and 0.1 V, respectively.

(b) Conductivity

The conductivity measurements for $AlCl_3$-TMAHCl, -TEAHCl and -urea were obtained by employing electrochemical impedance spectroscopy (EIS) measurements at a perturbation amplitude of 10 mV. Each electrolyte was contained in a house made PTFE Swagelok cell with Mo (3 mm diameter) as the working and the auxiliary electrodes. The electrolytes were allowed to equilibrate at 25° C. (±1° C.) in an argon filled oven for 12 hours prior to conducting the measurements.

(c) Raman Spectroscopy

Raman spectra of the electrolytes were acquired by a Dispersive Raman Microscope (Bruker) using $Ar^+$ laser (532 nm) at a resolution of 0.5 $cm^{-1}$. For each electrolyte composition, a total of 5 spectra were acquired and an averaged value of the spectra is presented. In situ Raman spectroscopy was conducted on an Al/GNP pouch cell with a UV-grade quartz window. The power of the laser used was 10 mW. Prior to acquiring the spectra, the cell was cycled at 500 mA $g^{-1}$ for several cycles to stabilize the battery performance. The spectra were recorded (5-s acquisition time, and one accumulation) at 500 mA $g^{-1}$. X-ray diffraction (XRD) patterns were obtained through a Rigaku Miniflex 600 X-ray diffractometer with Cu Kα1 radiation (1.5405 Å) in the range of 20-30°. X-ray photoelectron spectroscopy (XPS) analysis was collected on an Escalab250Xi spectrometer with an Mg (Kα) source.

Example 4: Characterization of Ionic Liquid Electrolytes

The electrolyte was prepared by mixing TMAHCl and certain (1.0-2.0) mole equivalent anhydrous $AlCl_3$ in an argon atmosphere glove box. At ambient temperature (~25° C.), a transparent liquid was obtained across $AlCl_3$/TMAHCl ratio of 1.6-1.9 by mole; whereas, below 1.6 ratio, the electrolyte was either cloudy or gel-type, and at ratio of 2.0, a white precipitate (presumably $AlCl_3$) was formed in the vial (FIG. 1(*a*)).

To investigate the effect of temperature on the physical state of the electrolyte and to determine its operating temperature limit, the electrolyte was subjected to a controlled temperature environment ranging between −20 and 210° C. As shown in FIG. 1(*b*), only $AlCl_3$/TMAHCl with molar ratios between 1.7 and 1.8 remained transparent over the entire temperature range and others solidified at lower temperatures.

Figure 2:
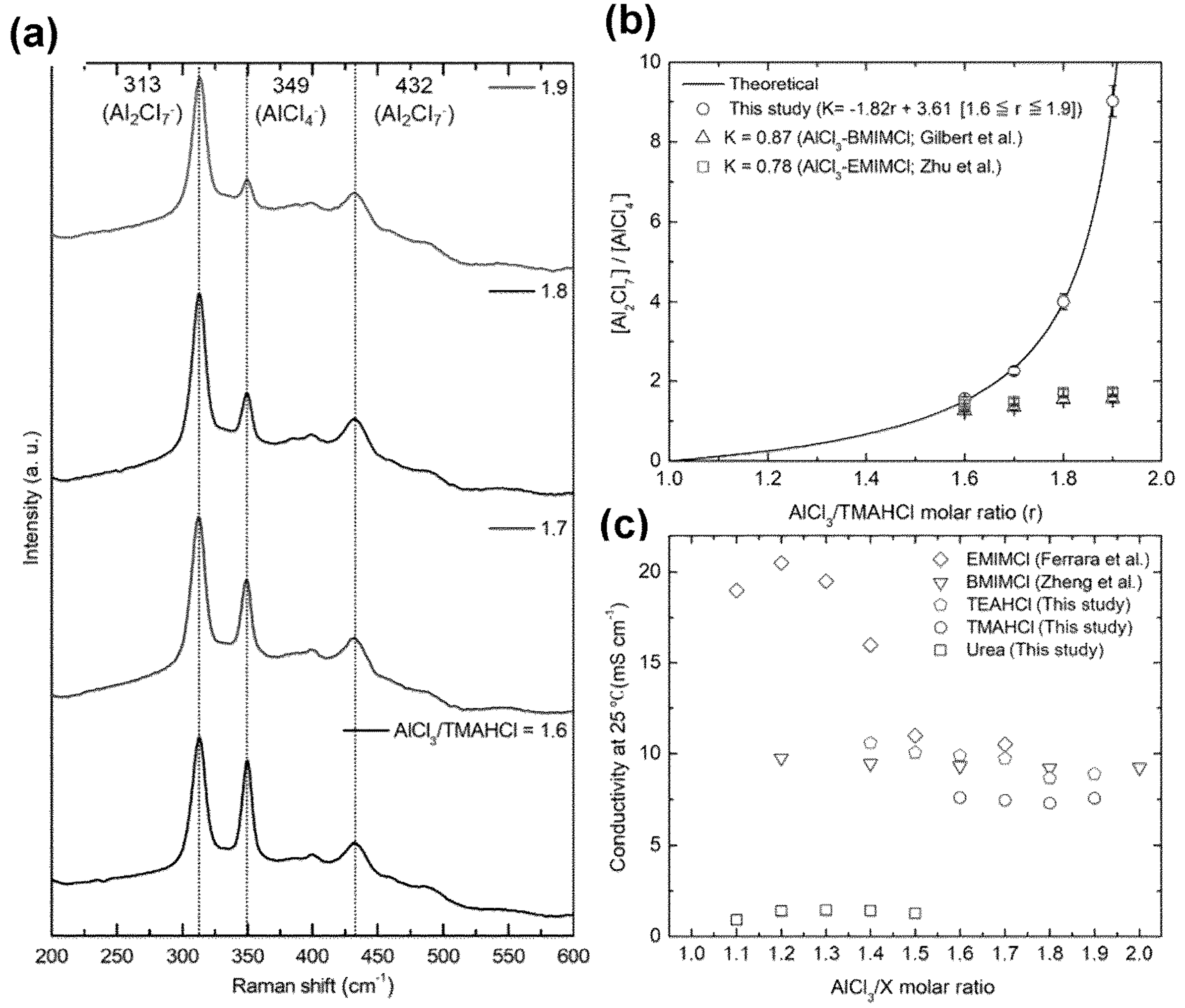
FIG. 2 presents (a) Raman spectra of $AlCl_3$/TMAHCl at molar ratios of 1.6-1.9; (b) the theoretical and calculated $[Al_2Cl_7^-]/[AlCl_4^-]$ ratio in $AlCl_3$-TMAHCl ionic liquid electrolytes; and (c) the comparison of $AlCl_3$-TMAHCl ionic conductivity with that of $AlCl_3$-EMIMCI, $AlCl_3$-BMIMCI, $AlCl_3$-TEAHCl, and $AlCl_3$-urea at 25° C.

Raman spectroscopy was performed to verify the presence of chloroaluminate anions ($AlCl_4^-$ and $Al_2Cl_7^-$) in this electrolyte, since the Raman shifts of $AlCl_4^-$ and $Al_2Cl_7^-$ are characteristics of the chloroaluminate ionic liquids and the peak positions do not depend on the cationic species. As shown in FIG. 2(*a*), $Al_2Cl_7^-$ (main shift at ~313 $cm^{-1}$) and $AlCl_4^-$ (~349 $cm^{-1}$) are both present in the electrolyte made of $AlCl_3$/TMAHCl with 1.6-1.9 molar ratios. To further estimate the relative concentration between the two anionic species, the dissociation of $AlCl_3$—XCl (X: organic group; e.g., EMIM, BMIM, TMAH, etc.) ILs follows:

$$r\mathrm{AlCl_3{\cdot}XCl}=(2-r)\mathrm{AlCl_4^-}+(r-1)\mathrm{Al_2Cl_7^-}+\mathrm{X^+} \quad (4)$$

where r (1≤r≤2) is the molar ratio of $AlCl_3$/XCl. At r=1, $AlCl_4^-$ is the only anionic species in the system, while at r=2, $Al_2Cl_7^-$ is the only anionic species and between these extremes, both anionic species are present. According to Equation 4, the theoretical relative concentration $[Al_2Cl_7^-]/[AlCl_4^-]$ can be expressed as a function of r where $[Al_2Cl_7^-]/[AlCl_4^-]=(r-1)/(2-r)$. According to previous studies, the ratio of the peak Raman intensity obtained for $Al_2Cl_7^-/AlCl_4^-$ ($I_{Al_2Cl_7^-}/I_{AlCl_4^-}$) is directly proportional to $[Al_2Cl_7^-]/[AlCl_4^-]$ with a proportionality constant K (where $I_{Al_2Cl_7^-}/I_{AlCl_4^-}=K[Al_2Cl_7^-]/[AlCl_4^-]$), also known as the Raman scattering cross-section (RSCS) ratio between $Al_2Cl_7^-$ and $AlCl_4^-$. The value of K can be empirically determined by plotting $I_{Al_2Cl_7^-}/I_{AlCl_4^-}$ versus (r−1)/(2−r). For $AlCl_3$-BMIMCl and $AlCl_3$-EMIMCl ILs, the values of K are 0.87, and 0.78, respectively. As presented in FIG. 2(*b*), the results indicate that this constant-value approach provides a reasonable estimation of $[Al_2Cl_7^-]/[AlCl_4^-]$ at lower molar ratios (e.g., at $AlCl_3$/TMAHCl=1.6).

However, as $AlCl_3$ content increases, a larger deviation from the theoretical prediction suggests this constant K-value approach cannot address the Raman scattering dynamics between $Al_2Cl_7^-$ and $AlCl_4^-$, particularly at higher $AlCl_3$/XCl molar ratios. RSCS is known to be a function of temperature, excitation frequency, and concentration of dissolved solute. Since in most experiments, temperature and the excitation frequency are kept constant during the measurements, the concentration of $Al_2Cl_7^-$ and $AlCl_4^-$ are the dominating factor affecting RSCS, particularly at high $AlCl_3$ contents. To account for the non-linear behavior of RSCS with respect to concentration, an empirical formula was developed to show the functionality of K to $AlCl_3$/TMAHCl molar ratio (r) in 1.6-1.9 region (where K=−1.82r+3.61). As shown in FIG. 2(*b*), this empirical formula provides a more accurate estimation of $[Al_2Cl_7^-]/[AlCl_4^-]$ compared with constant K value approach.

Evaluating the ionic conductivity of $AlCl_3$-TMAHCl is also of interest for practical applications. To investigate this, FIG. 2(*c*) compares the ionic conductivities of various chloroaluminate IL/IL analogs at 25° C. The ionic conductivity of $AlCl_3$-TMAHCl (average: ~7.5 mS $cm^{-1}$) is higher than that of $AlCl_3$-urea IL analog (~1.3 mS $cm^{-1}$), but slightly lower than that of $AlCl_3$-triethylamine hydrochloride (TEAHCl; ~9.6 mS $cm^{-1}$), $AlCl_3$-BMIMCI (~9.4 mS $cm^{-1}$), and $AlCl_3$-EMIMCI (~16.1 mS $cm^{-1}$).

Example 5: Characterization and Electrochemical Measurement Results (Cells)

(a) Al/Graphene Nanoplatelets (GNP) Cells

Figure 3:
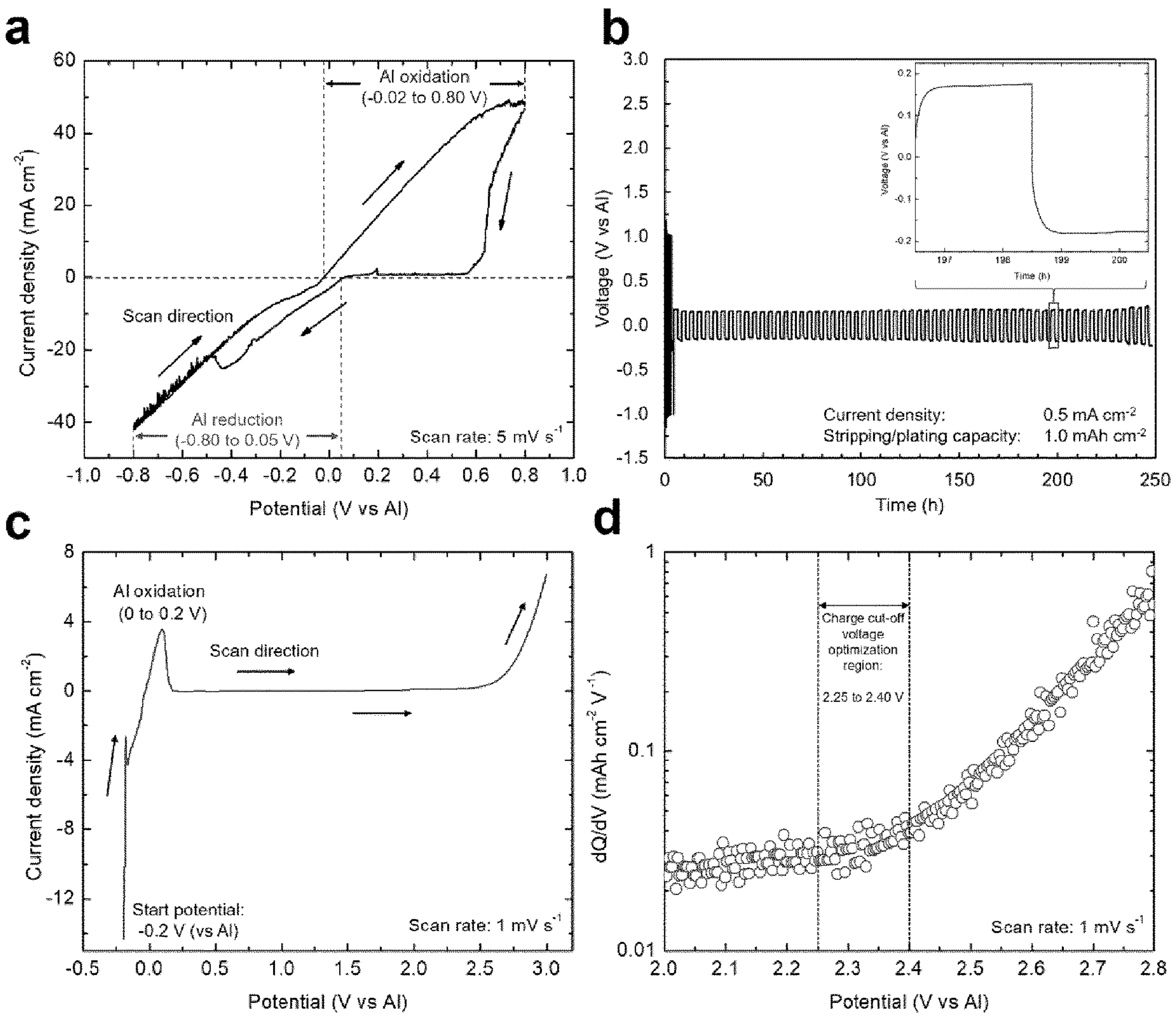
FIG. 3 shows (a) a CV curve of Al—Al cell employing of $AlCl_3$/TMAHCl=1.7 (by mole) at 5 mV $s^{-1}$; b) galvanostatic stripping/plating of an Al—Al symmetrical cell at 0.5 mA $cm^{-2}$ with an areal capacity of 1.0 mAh $cm^{-2}$ (inset: representative voltage profile of Al—Al symmetrical cell during electrostripping and plating); c) a linear sweep voltammogram of $AlCl_3$-TMAHCl on a Mo working electrode at 1 mV $s^{-1}$; and d) a corresponding differential capacity (dQ/dV) plot in 2.0-2.8 V range (vs. Al).

In view of the above results, a ratio of $AlCl_3$/TMAHCl=1.7 (by mole) was used for electrochemical evaluation and subsequent battery testing for its wider liquidus range. Prior to battery testing, electrochemical techniques including cyclic voltammetry (CV), galvanostatic stripping/plating of aluminum, and linear sweep voltammetry (LSV), were employed to investigate various electrochemical aspects of the electrolyte. An oxidation wave from −0.02 to 0.80 V (vs. Al) and a reduction wave from 0.05 to −0.80 V observed in the CV of Al represent the electrostripping/plating of Al, respectively (FIG. 3(*a*)). In addition, the voltage profile obtained from galvanostatic stripping/plating of Al—Al symmetrical cell shows the stability of reversible Al electrostripping/plating in $AlCl_3$-TMAHCl IL over 250 h (FIG. 3(*b*)). On the basis of the LSV curve and the differential capacity (dQ/dV) plot in 2.0-2.8 V range (vs. $Al/Al^{3+}$), 2.4 V (vs. $Al/Al^{3+}$) was determined as oxidation potential limit for this electrolyte (FIGS. 3(*c*) and (*d*)).

Figure 4:
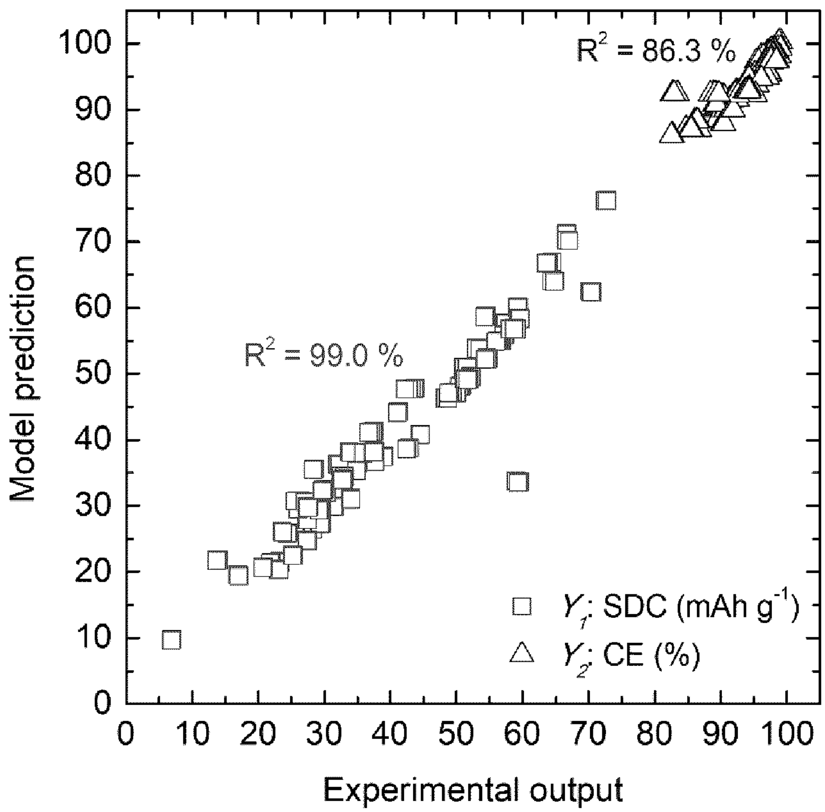
FIG. 4 presents the correlation between the model predicted and the experimentally measured results for the charging/discharging optimization trials.

For determining the optimum charge/discharge conditions for Al batteries, most previous studies have utilized a "one-variable-at-a-time" approach, by measuring the CE obtained across various charge/discharge cut-off voltages under a constant current density. However, the CE obtained at a particular charge/discharge voltage often depends on the current density utilized. To account for the contribution of current density on CE, a four-level full factorial design of experiment (DOE) with three operating variables ($X_1$: charge cut-off voltage, $X_2$: discharge cut-off voltage, and $X_3$: current density) was utilized to determine the statistically optimum conditions for AI/GNP battery employing $AlCl_3$-TMAHCl electrolyte. On the basis of the optimization results, the optimal set of charge/discharge conditions are a charging cut-off voltage of 2.37 V, a discharging cut-off voltage of 0.50 V, and charge/discharge rate of 3068 mA $g^{-1}$ which yield a CE above 98.5%. The experimental battery testing results from the trials are plotted against their corresponding model predicted results, and the correlation coefficient ($R^2$) is calculated. The results for the specific discharge capacity ($Y_1$), and the Coulombic efficiency ($Y_2$) are presented in FIG. 4. These operating paraments were used in subsequent trials.

Among the properties that can affect the performance of Al/graphite batteries, several reports have indicated that the particle size of graphitic materials exerts a significant impact on the overall battery performance. However, no existing study quantitatively addresses the correlation between particle size and battery performance. In the present case, the aspect ratio of GNPs was used to investigate the size effect on Al battery performance.

To help the quantitative evaluation, a systematic approach and statistical analysis through a pentagonal response surface design was employed to assess the effect GNP aspect ratio on specific discharge capacity ($Y_1$) and CE ($Y_2$) obtained across various cathode loadings ($X_4$) and current densities ($X_5$). Contour plots (not shown) presenting the model predicted specific discharge capacity and CE across various material loadings and charge/discharge current densities for each GNP aspect ratio, respectively, were prepared. From the results, Al batteries employing GNP-1000 cathode exhibited the highest specific discharge capacity and comparable CE relative to other GNPs. For instance, the average discharge capacity of the Al/GNP-1000 was 65 mAh $g^{-1}$; whereas, it was ~46 mAh $g^{-1}$ for GNP-333, ~35 mAh $g^{-1}$ for GNP-2143, and ~29 mAh $g^{-1}$ for GNP-3571. Among the material loadings evaluated, 0.7 mg $cm^{-2}$ was determined as the optimum loading for Al/GNP-1000 battery by rendering highest capacity and reasonable CE across all current densities.

Figure 5:
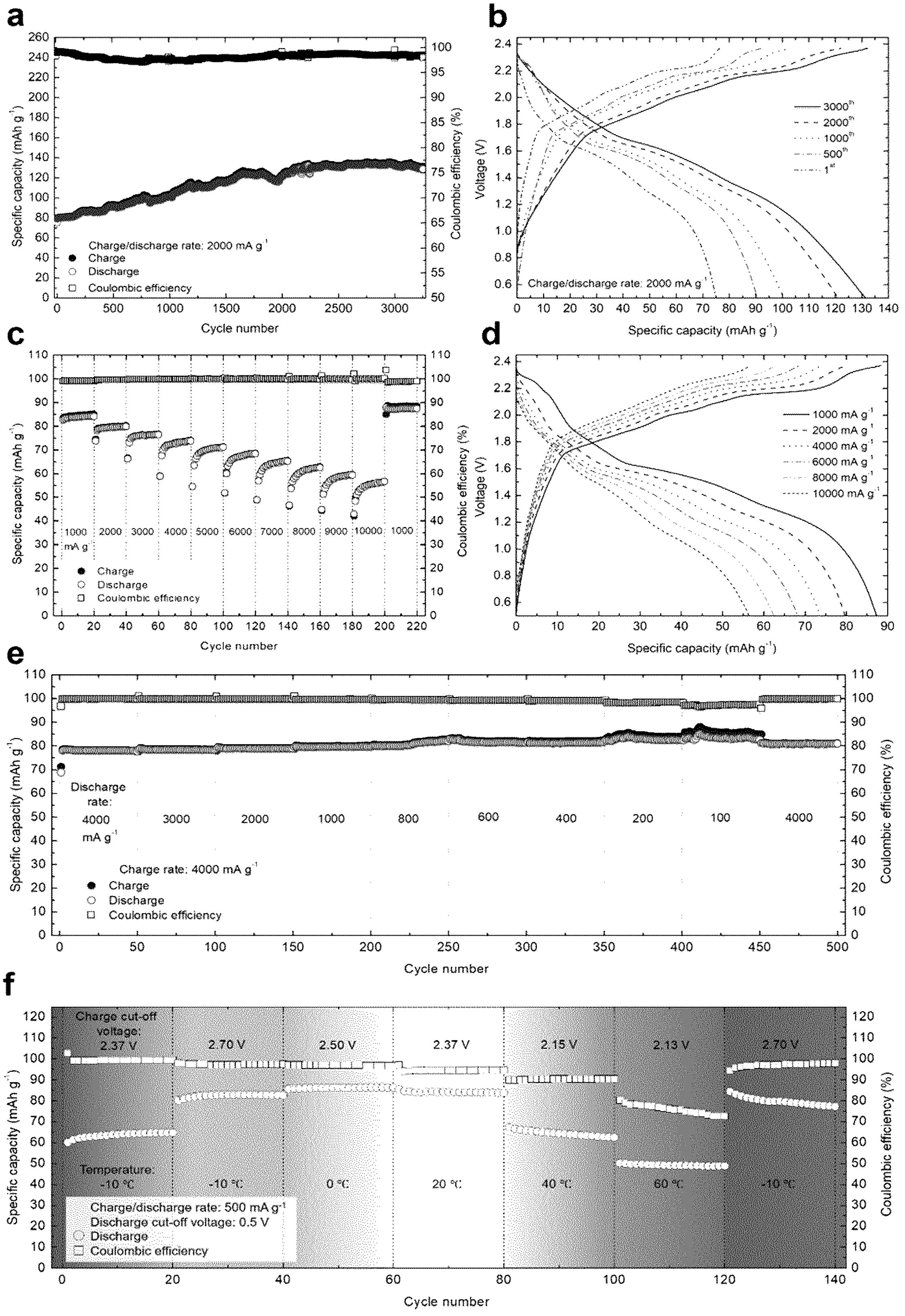
FIG. 5 shows results of a) galvanostatic cycling over 3000 cycles (at a current density of 2000 mA $g^{-1}$ and 2.37/0.5 V upper/lower cut-off voltage); b) corresponding voltage profiles in the $1^{st}$, $500^{th}$, $1000^{th}$, $2000^{th}$, and $3000^{th}$ cycle; c) rate capability at different charge/discharge current densities from 1000 to 10000 mA $g^{-1}$; d) corresponding voltage profiles at each charge/discharge rate; e) fast-charge/slow-discharge performance of the Al battery charging at 4000 mA $g^{-1}$ and discharging at 100 to 4000 mA $g^{-1}$; and f) galvanostatic cycling (at 500 mA $g^{-1}$) at a temperature range of −10 to 60° C., of an Al/GNP-1000 battery using the $AlCl_3$/TMAHCl electrolyte at a molar ratio of 1.7.

Utilizing the optimum charge/discharge conditions, the electrochemical performance of Al/GNP-1000 battery employing $AlCl_3$/TMAHCl=1.7 electrolyte was evaluated. FIG. 5(*a*) presents the results of galvanostatic cycling test. The specific capacity gradually increased from ~80 to ~134 mAh $g^{-1}$ while maintaining an average CE above 98% for over 3000 cycles at 2000 mA $g^{-1}$. Such an increase in the specific capacity can be attributed to the self-activating behavior of anion intercalation-based graphitic cathode, i.e., during the regular intercalation/deintercalation process, a larger electrochemical active surface area becomes available as a result of the exfoliation of graphitic cathode. Despite a significant increase in the capacity, the shape of the charge/discharge voltage profile remains relatively unchanged with average discharge voltages ranging between 1.43-1.49 V (FIG. 5(*b*)). FIG. 5(*c*) presents the rate performance of the battery showing decreasing capacity with increasing current density, but a high CE (~99%) was still achieved across all current densities. As can be seen, even at an ultrahigh current density of 10000 mA $g^{-1}$ (corresponding to ~24 s charge/discharge), a cathodic specific capacity of ~57 mAh $g^{-1}$ was achieved, which was ~67% capacity retention of its initial capacity (84 mAh $g^{-1}$) at 1000 mA $g^{-1}$. When the current density was slowed, a reversible capacity of 87 mAh $g^{-1}$ was obtained. The corresponding voltage profiles across different current densities are presented in FIG. 5(*d*).

Figure 6:
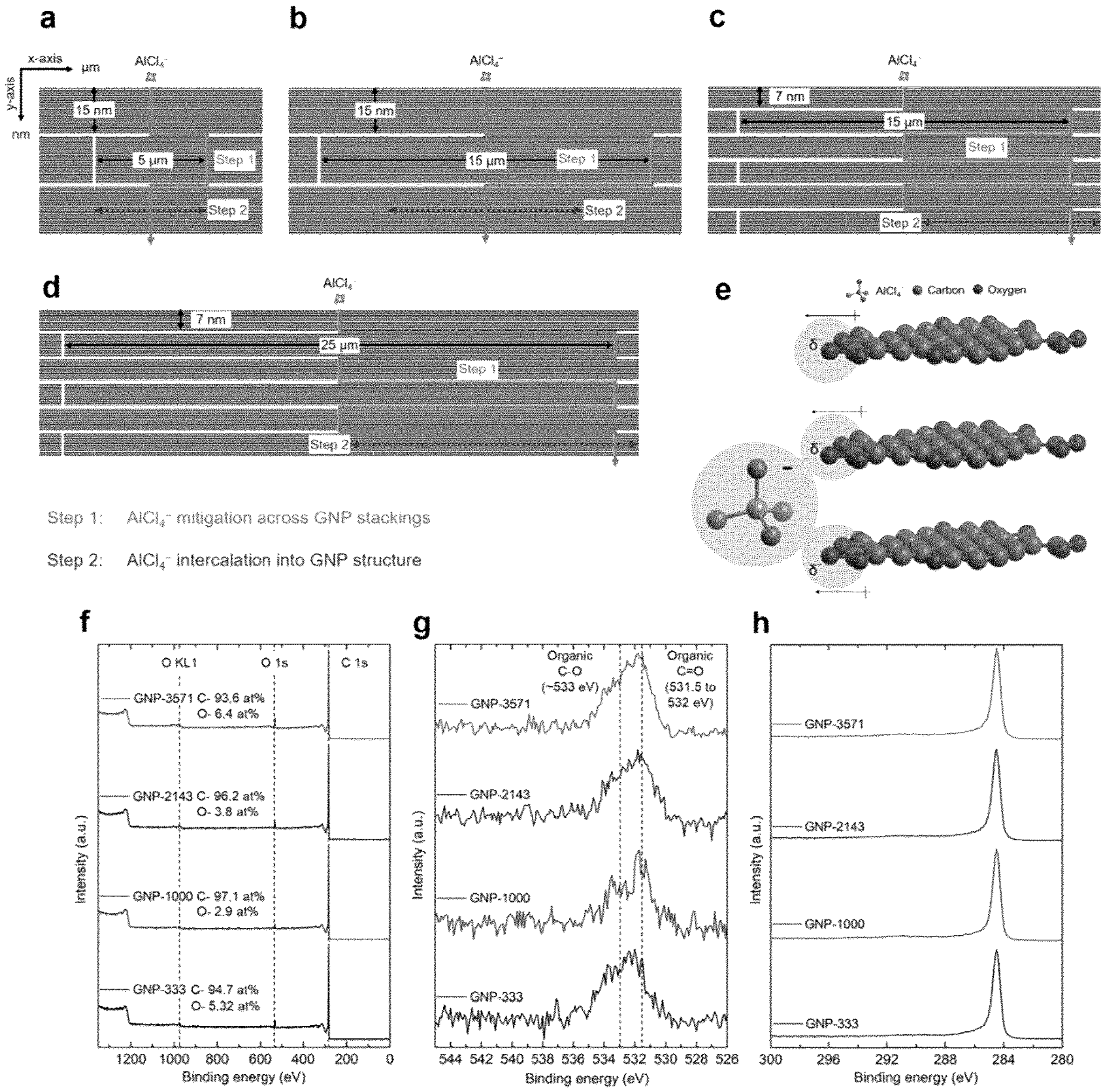
FIG. 6 presents $AlCl_4^-$ transportation/intercalation kinetic model into GNP of various aspect ratios in a) GNP-333, b) GNP-1000, c) GNP-2143 and d) GNP-3571; e) a schematic diagram illustrating the repulsion between $AlCl_4^-$ and functional groups near the edges of graphene planes during intercalation; f) XPS survey scan of as-received GNPs; carbon and oxygen compositions are presented; g) corresponding XPS spectra of the O 1 s peak; and h) corresponding XPS spectra of the C 1s peak.

To rationalize the relationship between the observed specific capacity and the GNP aspect ratio, was employed an ion transportation model (FIGS. 6(*a*) to (*d*)) which can help examine the effect of GNP aspect ratio on $AlCl_4^-$ diffusion and intercalation kinetics. To facilitate the evaluation, the thickness of cathode, the spacing between GNP units, and the position of each GNP unit with respect to the previous layer, were kept consistent across all aspect ratios. As illustrated in FIGS. 6(*a*) to (*d*), the $AlCl_4^-$ migration process in GNP can be divided to two steps: 1) diffusion of $AlCl_4^-$ across tortuous pathways resulting from GNP stacking (step 1) and 2) $AlCl_4^-$ intercalation into GNP graphitic structures (step 2). Considering the standard relationship that relates diffusion length (x) with diffusion coefficient (D), and diffusion time (t) following $x=\sqrt{Dt}$, the total time required (trocar) for $AlCl_4^-$ transportation/intercalation into GNP that corresponds to total charging time can be expressed as:

$$t_{total} = t_m + t_i = \frac{x_m^2}{D_m} + \frac{x_i^2}{D_i} \tag{5}$$

where $t_m$, $x_m$ and $D_m$ are time, distance, and diffusion coefficient of $AlCl_4^-$ diffusion across tortuous pathways resulting from GNP stackings and $t_i$, $x_i$ and $D_i$ are time, distance, and diffusion coefficient of $AlCl_4^-$ intercalation into GNP graphitic structures, respectively. Using this model, the total time required for $AlCl_4^-$ transportation/intercalation were qualitatively compared across the four investigated aspect ratios. As presented in Table 1 below, $t_{total}$ is expected to increase monotonically with increasing GNP aspect ratios.

TABLE 1

Qualitative comparison of $t_{total}$ required for $AlCl_4^-$ diffusion and intercalation across GNP with various aspect ratios.

| Thickness (nm) | Lateral size (μm) | Aspect ratio | $t_m = \frac{x_{m^2}}{D_m}$ | $t_i = \frac{x_{i^2}}{D_i}$ | $t_{total}$ |
|---|---|---|---|---|---|
| 15 | 5 | 333 | fastest | fastest | shortest |
| | 15 | 1000 | fast | moderate | short |
| 6-8 | 15 | 2143 | slow | moderate | long |
| | 25 | 3571 | slowest | slowest | longest |

Since the overall rate performance of a battery is fundamentally governed by the transportation/intercalation kinetics of electroactive species in the electrode materials, Al batteries employing GNP with the smallest aspect ratio (GNP-333) cathode would be expected to demonstrate the best rate performance, followed by GNP-1000, GNP-2413, and finally GNP-3571. Overall, the results of statistical analyses reasonably agree with the model prediction in that the specific discharge capacity decreases with increasing GNP aspect ratio. However, the model contradicted the experimentally determined best GNP aspect ratio, which was 1000 rather than 333. This discrepancy between the statistical analyses and the diffusion model could be explained, for instance, by the presence of unintended polar functional groups in the GNPs. The enrichment of polar functional groups (e.g., carboxyl and hydroxyl) near the edges of graphene can deteriorate battery performance since a higher activation energy is required to overcome the electrostatic repulsion between $AlCl_4^-$ ions and polar functional groups near graphene edges (see FIG. 6(*e*)). To verify this effect, the oxygen content of the GNP with four aspect ratios was measured using X-ray photoelectron spectroscopy (XPS). As shown in FIGS. 6(*f*) and (*g*), pristine GNP-333 has a higher oxygen content compared with GNP-1000. The corresponding chemical environment of the O 1 s peak can be mainly associated to organic C—O and organic C═O bonding, indicating a higher proportion O-containing electronegative functional groups in GNP-333 (5.32 at %) compared with GNP-1000 (2.90 at %).

Cyclic voltammetry (CV) was utilized to study the charge storage kinetics and mechanism of the GNP cathode. In theory, the current response (i) in a scan-rate experiment under a scan rate (v) can be expressed by the power law equation: $i=av^b$ in which a and b are arbitrary coefficients. The value of b is an indicative factor for the charge storage mechanism, as b≈0.5 indicates a slow diffusion-controlled faradaic reaction, while b≈1.0 indicates fast near surface reactions, such as charging/discharging of the electric double layer (capacitive reaction) and surface redox reaction (pseudocapacitive reaction); b value between 0.5 and 1.0 indicates a transition between the two charge storage mechanisms. FIG. 7(*a*) presents the CV curves of GNP-1000 cathode at 1.5-3.5 mV $s^{-1}$ scan rate range. Four pairs of distinct redox peaks (labelled as Ox1-4, Red1-4) are observed and by plotting log $i_{peak}$ against log v, the value of b at each redox peak are determined (FIG. 7(*b*)). Across the redox peaks, the b values were found to lie between 0.5 and 1.0, indicating a significant (pseudo)capacitive contribution in addition to diffusion-controlled faradaic contribution to overall charge storage. Furthermore, by taking both diffusion-limited reactions (where b=0.5) and near surface reactions (b=1.0) into consideration, a general expression (where $i=k_1v^{0.5}+k_2v^-$; $k_1$ and $k_2$: arbitrary coefficients) that accounts for all possible cases can be employed to quantitatively distinguish the two contributions. The constants $k_1$ and $k_2$ at any given potential can be determined from the y-axis intercept and the slope $iv^{-0.5}$ plot versus $v^{0.5}$. Using this approach, at 1.5 mV $s^{-1}$, (pseudo)capacitive reactions were found to account for approximately 60% of the total electrochemical reactions and this contribution increased to ~69% at a higher scan rate of 3.5 mV $s^{-1}$ (FIGS. 7(*c*) and (*d*)). This high proportion of (pseudo)capacitive contribution in addition to diffusion-controlled faradaic contribution that is the main charge storage mechanism in most battery chemistries, can explain the favorable rate performance observed for Al/GNP batteries (FIGS. 5(*c*) and (*e*)). Considering bulk graphite also exhibits a similar (pseudo)capacitive behavior when utilized as the cathode in dual-ion and Al batteries, the remarkably high power density and long cyclability of Al batteries employing carbonaceous and graphitic materials is largely due to the fast kinetics and surface-redox nature of (pseudo)capacitive reactions.

To further investigate the charge storage mechanism of Al/GNP battery, in situ Raman spectroscopy was performed to probe the structural dynamics of GNP during charging and discharging (FIG. 7(*e*)). The presence of intercalants in graphitic materials (for stages >2) can be determined by splitting the single Raman G peak at ~1580 $cm^{-1}$ into two distinct peaks at ~1585 $cm^{-1}$ ($E_{2g2}$(i)) and ~1605 $cm^{-1}$ ($E_{2g2}$(b)), which correspond to carbon atom vibrations at the interior layers not adjacent to the intercalants and the bounding layers adjacent to the intercalants, respectively. Based on the peak intensity ratio between the $E_{2g2}$(i) and $E_{2g2}$(b) ($I_i/I_b$), the intercalation stage index (n) was calculated at various charge/discharge voltages using $I_i/I_b=(K_i/K_b)(n-2)/2$, where $K_i/K_b$ represents the RSCS ratio between inner (i) and outer (b) boundary layers, which was set at unity. As shown in FIG. 7(*f*), the two $E_{2g2}$ peaks observed at open-circuit voltage (OCV) signaled the presence of residue chloroaluminate anions in the graphitic structure of GNP as a result of initial pre-cycling (as evidenced by distorted X-ray diffractogram (XRD) obtained for fully discharged GNP in FIG. 7(*g*)). The disappearance of the doublet peaks with only the $E_{2g2}$(b) peak remaining at 2.23 V (point C6) upon charging implies the formation of a stage 1 or 2 graphite intercalation compounds (GICs).

Considering that the laser penetration depth into graphite/graphene is approximately 50 nm for a 532 nm laser, only GNPs near the electrode surface are expected to trigger such high stages of intercalation. This statement is further supported by the ex situ XRD spectrum obtained for fully charged GNP (FIG. 7(*g*)) which shows the formation of stage 3 GICs with a gallery expansion (Δd) of 5.53 Å, which agrees well with the size of $AlCl_4^-$ in the range of 4.79-6.09 Å. The experimentally obtained cathodic capacity (~134 mAh $g^{-1}$) is also in a good agreement with the theoretical capacity of stage-3 GICs (~124 mAh $g^{-1}$). Upon discharging, the spectra obtained were reflective of the charging process, with a gradual redshift of $E_{2g2}$(b) peak and the reappearance of $E_{2g2}$(i) at lower discharge voltages (FIG. 7(*e*)). Noticeably, the recovery of doublet peaks did not occur until ~1.48 V (DC4) indicating that GNPs (within the laser interaction volume) remain as stage 1 or 2 GICs throughout the initial discharge process. Such observations agree reasonably well with the deconvoluted CV curve (FIG. 7(*c*)) demonstrating the (pseudo)capacitive contribution dominated initial discharge region at 1.7-2.3 V, and a significant diffusion-controlled current that followed at ~1.6 V signaling major de-intercalation of $AlCl_4^-$ from the graphitic structure.

(b) Al/$SeS_2$ Cells

Figure 8:
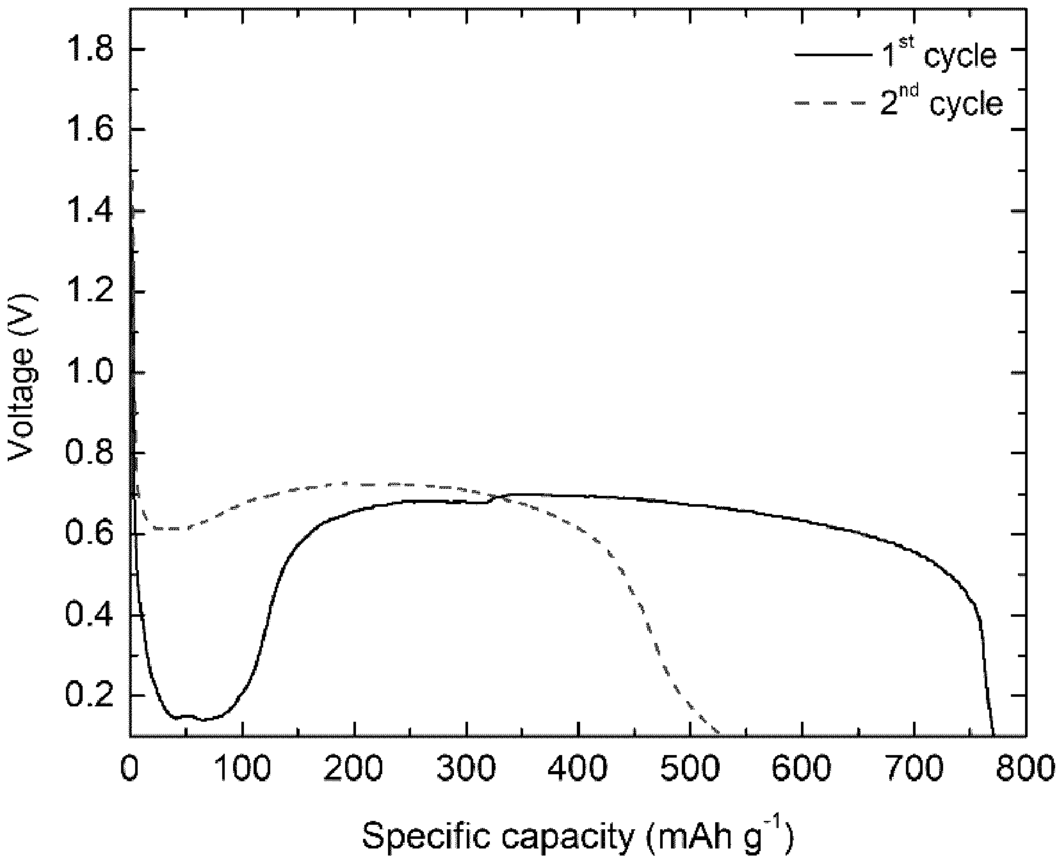
FIG. 8 shows the discharge voltage profile of an Al/$SeS_2$ battery employing $AlCl_3$/TMAHCl=1.7 (by mole) as electrolyte with a material loading for the $SeS_2$ cathode of ~1.3 mg/$cm^2$.

In addition to graphitic/carbonaceous cathode materials as presented in previous sections, other material such as metal oxides, metal sulfides, and non-metal sulfides can also be used as cathode materials for Al batteries. To investigate the electrochemical performance of a non-graphitic cathode using $AlCl_3$-TMAHCl IL electrolytes, the Al/$SeS_2$ system was investigated and the result is presented in FIG. 8. This system exhibited an excellent specific discharge capacity of ~771 mAh $g^{-1}$ with an average discharge voltage ($V_{avg}$) of 0.57 V at 50 mA $g^{-1}$ in the first cycle; corresponding to a cathodic specific energy density equivalent to ~440 Wh $kg^{-1}$. In the subsequent cycle, the cell can deliver a specific capacity of 530 mAh $g^{-1}$ with an increase in $V_{avg}$ to 0.61 V, yielding a cathodic specific energy density of 323 Wh $kg^{-1}$. Given the fact that there is no current literature on Al/$SeS_2$ battery employing chloroaluminate ILs, further investigations will be conducted to elucidate the underlying charge storage mechanism.

(c) Al/Se—S@CMK Cells

Figure 9:
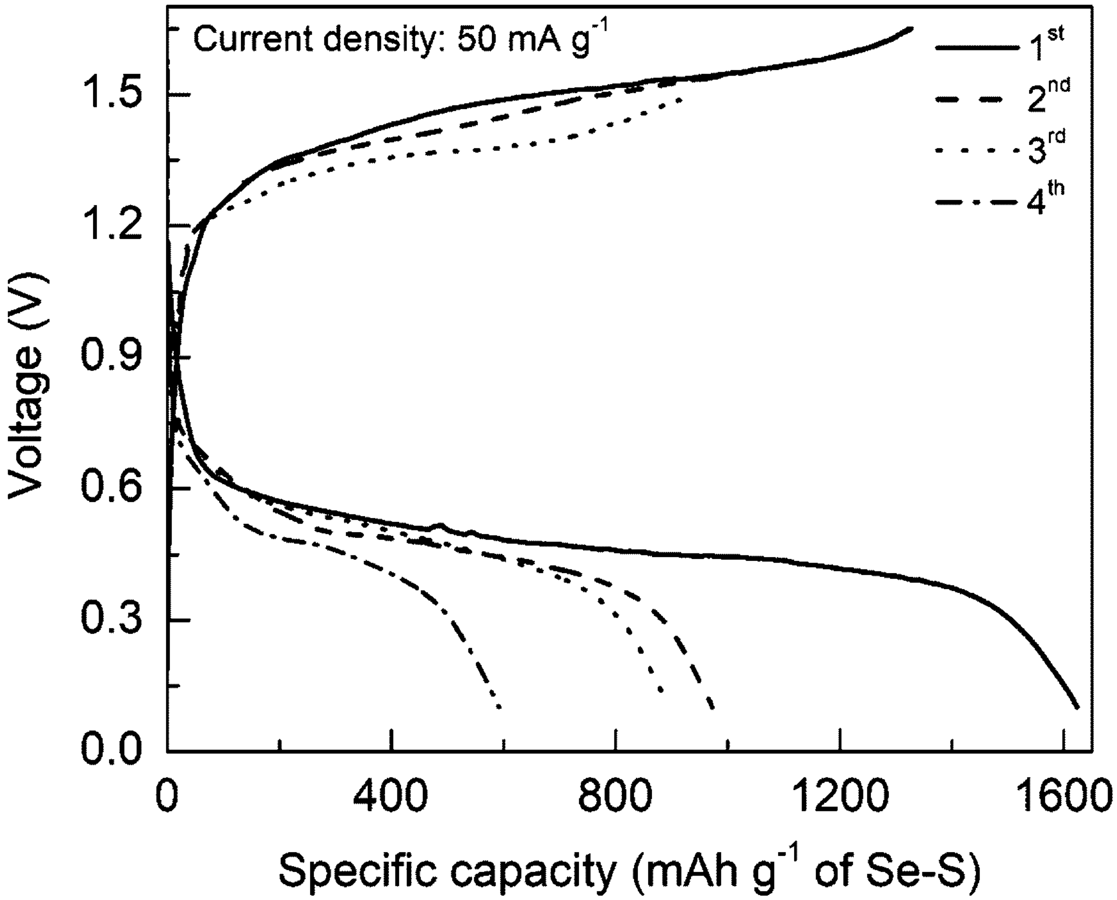
FIG. 9 shows the charge-discharge voltage profile of an Al/Se—S in CMK battery $AlCl_3$/TMAHCl=1.7 (by mole) as electrolyte.

To further improve the electrochemical performance of aluminum-ion battery employing Se—S-based cathode materials, elemental Se and S were embedded in porous carbonaceous host (CMK-3). The performance of resulting Al/Se—S@CMK battery is presented in FIG. 9. This new strategy enabled the battery to deliver a specific discharge capacity of ~1624 mAh $g^{-1}$ with an average discharge voltage ($V_{avg}$) of 0.46 V at 50 mA $g^{-1}$ in the first cycle; corresponding to a cathodic specific energy density equivalent to ~755 Wh $kg^{-1}$. In the $2^{nd}$, $3^{rd}$, and $4^{th}$ cycle, the cell delivered a specific capacity of 973, 894, and 592 mAh $g^{-1}$, respectively. This proposed Se—S hosting strategy favored positively on improving the specific discharge capacity as well as the capacity retention of aluminum-ion batteries employing Se—S-based cathode materials.

Numerous modifications could be made to any of the embodiments described above without departing from the scope of the present invention. Any references, patents or scientific literature documents referred to in this document are incorporated herein by reference in their entirety for all purposes.

The invention claimed is:

1. An electrochemical cell comprising:

an anode comprising metallic aluminum;

a cathode comprising a cathode electrochemically active material, wherein the cathode electrochemically active material comprises graphene nanoplatelets having a lateral size/thickness aspect ratio between 500 and 1600; and an electrolyte consisting of $AlCl_3$, trimethylamine hydrochloride, and resulting products forming an ionic liquid and comprising less than 5% by weight of other elements or impurities, and wherein the molar ratio of $AlCl_3$ to trimethylamine hydrochloride is within the range of 1.6:1 to 1.9:1.

2. The electrochemical cell of claim 1, wherein the molar ratio of $AlCl_3$ to trimethylamine hydrochloride is within a range of 1.7:1 to 1.8:1.

3. The electrochemical cell of claim 1, wherein the graphene nanoplatelets have a lateral size/thickness aspect ratio between 750 and 1250.

4. The electrochemical cell of claim 1, wherein the graphene nanoplatelets have a lateral size/thickness aspect ratio of about 1000.

5. The electrochemical cell of claim 1, wherein the cathode is a free standing cathode.

6. The electrochemical cell of claim 1, wherein said cathode further comprises an electronically conductive carbon.

7. The electrochemical cell of claim 1, wherein cathode further comprises a binder.

8. The electrochemical cell of claim 1, wherein said cell further comprises a separator.

9. A battery comprising at least one electrochemical cell as defined in claim 8.

10. The battery of claim 9, wherein the battery is an aluminum-ion battery.

11. A method of supplying electric power to an external device comprising:

(a) providing the electrochemical cell as defined in claim 1;

(b) connecting the electrochemical cell to the external device; and (c) allowing electric current to flow from the electrochemical cell to the external device.

12. The method of claim 11, wherein the electrochemical cell is used in storing electrical energy within an electrical power grid, and the external device is connected to the electrical power grid.

* * * * *